United States Patent
Okiyama

(10) Patent No.: US 12,316,963 B2
(45) Date of Patent: May 27, 2025

(54) IMAGING APPARATUS, IMAGING METHOD, AND IMAGING PROGRAM

(71) Applicant: FUJIFILM Corporation, Tokyo (JP)

(72) Inventor: Kazuya Okiyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 150 days.

(21) Appl. No.: 18/344,874

(22) Filed: Jun. 30, 2023

(65) Prior Publication Data
US 2023/0345122 A1    Oct. 26, 2023

Related U.S. Application Data

(63) Continuation of application No. PCT/JP2021/047737, filed on Dec. 22, 2021.

(30) Foreign Application Priority Data

Jan. 15, 2021    (JP) ................................ 2021-005139

(51) Int. Cl.
*H04N 23/67*      (2023.01)
*G06T 7/20*      (2017.01)
*H04N 23/61*      (2023.01)

(52) U.S. Cl.
CPC ............... *H04N 23/67* (2023.01); *G06T 7/20* (2013.01); *H04N 23/61* (2023.01)

(58) Field of Classification Search
CPC ........... H04N 23/67; H04N 23/61; G06T 7/20
USPC ..................................................... 348/222.1
See application file for complete search history.

(56) References Cited

U.S. PATENT DOCUMENTS

| 9,277,110 | B2 | 3/2016 | Yoneyama et al. |
| 2011/0234885 | A1* | 9/2011 | Muramatsu ............ G03B 35/18 |
| | | | 348/E5.022 |
| 2018/0012078 | A1* | 1/2018 | Pournaghi ................. G06T 7/77 |

FOREIGN PATENT DOCUMENTS

| JP | 2009295018 | 12/2009 |
| JP | 2010156851 | 7/2010 |
| JP | 2013131996 | 7/2013 |
| JP | 2014202875 | 10/2014 |
| JP | 2018004916 | 1/2018 |

OTHER PUBLICATIONS

"International Search Report (Form PCT/ISA/210) of PCT/JP2021/047737", mailed on Mar. 22, 2022, with English translation thereof, pp. 1-5.

(Continued)

*Primary Examiner* — Joel W Fosselman
(74) *Attorney, Agent, or Firm* — JCIPRNET

(57) ABSTRACT

An imaging apparatus includes: an imaging element that images a subject through an imaging optical system; and a processor, and the processor is configured to: detect a moving object present in a plurality of pieces of pixel data obtained by the imaging element at different time points; perform detection processing of obstruction of the moving object by an object at a time point in a future based on a result of comparison between a first distance that is a predicted distance to the moving object at the time point in the future and a second distance that is a distance to the object present at a predicted positional coordinate of the moving object at the time point in the future; and perform an imaging control based on a result of the detection processing.

27 Claims, 14 Drawing Sheets

(56) References Cited

OTHER PUBLICATIONS

"Written Opinion of the International Searching Authority (Form PCT/ISA/237) of PCT/JP2021/047737", mailed on Mar. 22, 2022, with English translation thereof, pp. 1-6.

* cited by examiner

TIME POINT t1

TIME POINT t2

TIME POINT t3

TIME POINT t4

IMAGING APPARATUS, IMAGING METHOD, AND IMAGING PROGRAM

CROSS REFERENCE TO RELATED APPLICATION

This is a continuation of International Application No. PCT/JP2021/047737 filed on Dec. 22, 2021, and claims priority from Japanese Patent Application No. 2021-005139 filed on Jan. 15, 2021, the entire disclosures of which are incorporated herein by reference.

BACKGROUND OF THE INVENTION

1. Field of the Invention

The present invention relates to an imaging apparatus, an imaging method, and a computer readable medium storing an imaging program.

2. Description of the Related Art

In recent years, there has been a rapid increase in demand for information apparatuses such as a digital still camera, a digital video camera, or a smartphone having an imaging function in accordance with an increase in resolution of an imaging element such as a complementary metal oxide semiconductor (CMOS) image sensor. The above information apparatuses having the imaging function are referred to as imaging apparatuses. In the imaging apparatuses, a contrast auto focus (AF) system or a phase difference AF system is employed as a focus control system for focusing on a main subject.

JP2013-131996A discloses an imaging apparatus that detects an obstruction around a tracking position by comparing relative subject distance information at the tracking position with relative subject distance information in a surrounding area of the tracking position.

JP2010-156851A discloses a focus adjustment device that, in a case where a transition is made from a state where a subject is detected to a state where the subject is not detected, suppresses driving of a focus adjustment member for a time set in advance after the subject is not detected anymore, in a case where a degree of focus on a predetermined region is higher than a threshold value set in advance.

JP2014-202875A discloses an imaging apparatus that detects a position to be tracked in a captured image by evaluating a degree of correlation between the captured image from a tracking sensor and a standard image, individually tracks a subject to be focused at a time of focus adjustment as a main subject and tracks a subject positioned in front of the main subject in a view from the imaging apparatus as an obstructing subject, and performs the focus adjustment at a distance measurement position that is present on the main subject and that is not present on the obstructing subject.

SUMMARY OF THE INVENTION

One embodiment according to the disclosed technology provides an imaging apparatus, an imaging method, and a computer readable medium storing an imaging program that can suppress erroneous operation caused by obstruction (shielding) of a subject which is a moving object.

An imaging apparatus of one embodiment according to the disclosed technology is an imaging apparatus comprising an imaging element that images a subject through an imaging optical system, and a processor, in which the processor is configured to detect a moving object present in a plurality of pieces of pixel data obtained by the imaging element at different time points, perform detection processing of obstruction of the moving object by an object at a time point in the future based on a result of comparison between a first distance that is a predicted distance to the moving object at the time point in the future and a second distance that is a distance to the object present at a predicted positional coordinate of the moving object at the time point in the future, and perform an imaging control based on a result of the detection processing.

An imaging method of one embodiment according to the disclosed technology is an imaging method of an imaging apparatus including an imaging element that images a subject through an imaging optical system, and a processor, the imaging method comprising, via the processor, detecting a moving object present in a plurality of pieces of pixel data obtained by the imaging element at different time points, performing detection processing of obstruction of the moving object by an object at a time point in the future based on a result of comparison between a first distance that is a predicted distance to the moving object at the time point in the future and a second distance that is a distance to the object present at a predicted positional coordinate of the moving object at the time point in the future, and performing an imaging control based on a result of the detection processing.

An imaging program, which is stored in a computer readable medium, of one embodiment according to the disclosed technology is an imaging program of an imaging apparatus including an imaging element that images a subject through an imaging optical system, and a processor, the imaging program causing the processor to execute a process comprising detecting a moving object present in a plurality of pieces of pixel data obtained by the imaging element at different time points, performing detection processing of obstruction of the moving object by an object at a time point in the future based on a result of comparison between a first distance that is a predicted distance to the moving object at the time point in the future and a second distance that is a distance to the object present at a predicted positional coordinate of the moving object at the time point in the future, and performing an imaging control based on a result of the detection processing.

According to the present invention, it is possible to provide an imaging apparatus, an imaging method, and a computer readable medium storing an imaging program that can suppress erroneous operation caused by obstruction (shielding) of a subject which is a moving object.

DESCRIPTION OF THE PREFERRED EMBODIMENTS

Hereinafter, an embodiment of the present invention will be described with reference to the drawings.

Figure 1:
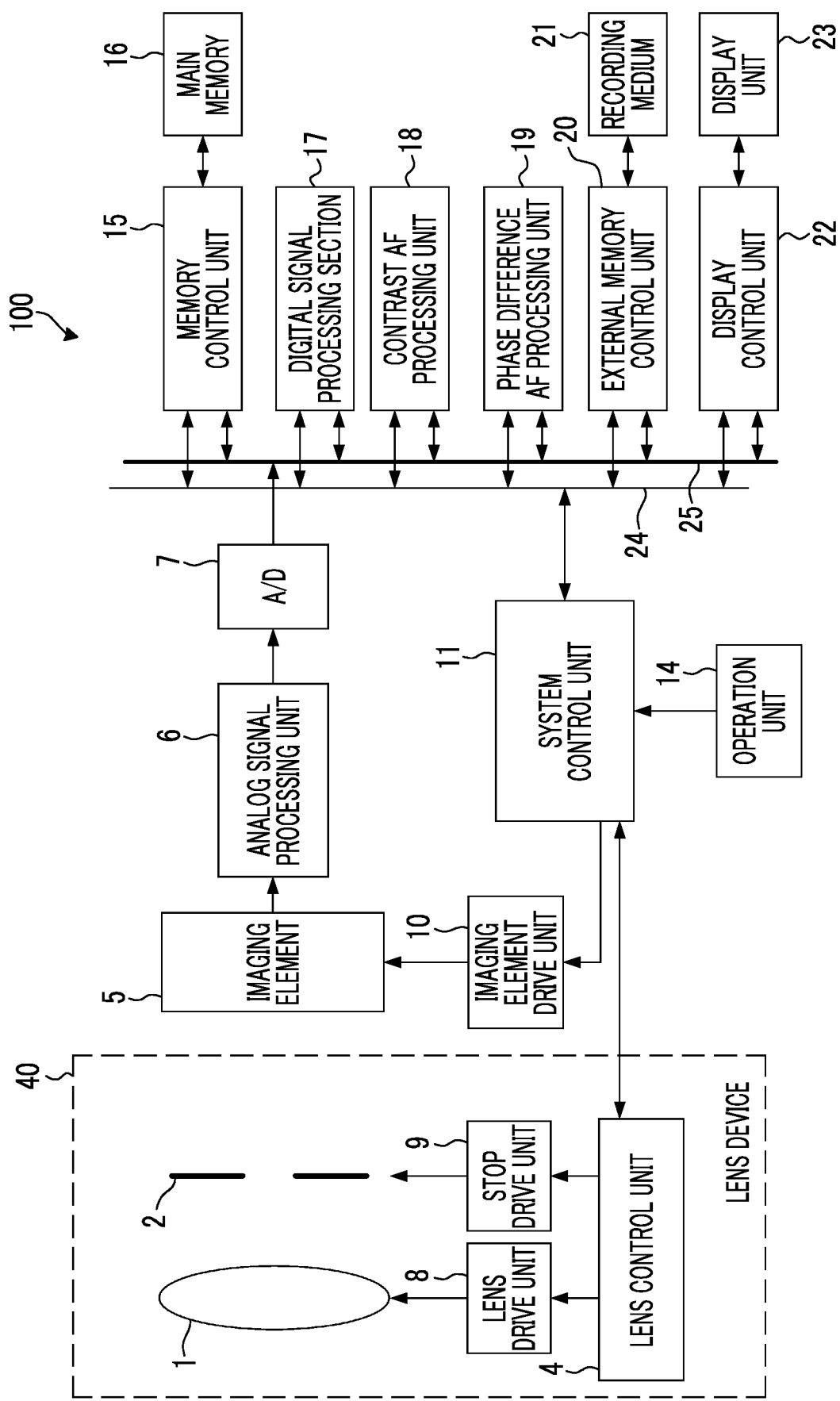
FIG. 1 is a diagram illustrating a schematic configuration of a digital camera 100 that is an embodiment of an imaging apparatus according to the present invention.

FIG. 1 is a diagram illustrating a schematic configuration of a digital camera 100 that is an embodiment of an imaging apparatus according to the present invention.

The digital camera 100 illustrated in FIG. 1 comprises a lens device 40 including an imaging lens 1, a stop 2, a lens control unit 4, a lens drive unit 8, and a stop drive unit 9.

In the present embodiment, the lens device 40 may be attachable to and detachable from a body of the digital camera 100 or may be fixed to the body of the digital camera 100.

The imaging lens 1 and the stop 2 constitute an imaging optical system. While the imaging lens 1 is described as one lens in FIG. 1, the imaging lens may be composed of a plurality of lenses including at least one focus lens or may be composed of only one focus lens. The focus lens is a lens for adjusting a focus position of the imaging optical system and is composed of a single lens or of a plurality of lenses. The focus position is adjusted by moving the focus lens in an optical axis direction of the imaging optical system. A liquid lens with which the focus position can be changed by variably controlling a curved surface of the lens may be used as the focus lens.

The lens control unit 4 of the lens device 40 is configured to communicate with a system control unit 11 in the body of the digital camera 100 in a wired or wireless manner.

The lens control unit 4 drives the focus lens included in the imaging lens 1 through the lens drive unit 8 or drives the stop 2 through the stop drive unit 9 in accordance with instructions from the system control unit 11.

The body of the digital camera 100 comprises an imaging element 5 such as a CMOS image sensor or a CCD image sensor that images a subject through the imaging optical system, an analog signal processing unit 6 that is connected to an output of the imaging element 5 and that performs analog signal processing such as correlative double sampling processing, an analog-to-digital conversion circuit 7 that converts an analog signal output from the analog signal processing unit 6 into a digital signal, an imaging element drive unit 10, the system control unit 11 that manages and controls the entire digital camera 100, and an operation unit 14. The analog signal processing unit 6 and the analog-to-digital conversion circuit 7 may be configured to be integrated with the imaging element 5.

The analog signal processing unit 6, the analog-to-digital conversion circuit 7, and the imaging element drive unit 10 are controlled by the system control unit 11. The imaging element drive unit 10 may be configured to be included in the system control unit 11.

The system control unit 11 drives the imaging element 5 through the imaging element drive unit 10 and outputs a subject image captured through the imaging optical system as a captured image signal. Command signals from a user are input into the system control unit 11 through the operation unit 14.

The system control unit 11 is composed of a processor, a random access memory (RAM), and a read only memory (ROM) such as a flash memory. In a case where a flash memory is used, a stored program can be rewritten as necessary.

The system control unit 11 implements each function, described later, by executing programs including an imaging program stored in the incorporated ROM.

Furthermore, an electric control system of the digital camera 100 comprises a main memory 16, a memory control unit 15 connected to the main memory 16, a digital signal processing section 17 that generates captured image data by performing signal processing on the captured image signal output from the analog-to-digital conversion circuit 7, a contrast AF processing unit 18 that calculates the focus position based on a contrast AF system, a phase difference AF processing unit 19 that calculates the focus position based on a phase difference AF system, an external memory control unit 20 to which an attachable and detachable recording medium 21 is connected, and a display control unit 22 to which a display unit 23 mounted on a camera rear surface or the like is connected.

The focus position is a position of the focus lens that focuses on a subject. The focus position is changed by driving the focus lens included in the imaging lens 1. The contrast AF processing unit 18 and the phase difference AF processing unit 19 calculate the focus position that matches a subject to be focused. The focus position matching a subject changes depending on a distance between the digital camera 100 and the subject.

For example, the focus position matching the subject is calculated from defocus data in phase difference AF. The defocus data is data indicating how much and in which the subject is currently out of focus. For example, in contrast AF, the focus position is calculated from a contrast of the subject.

The memory control unit 15, the digital signal processing section 17, the contrast AF processing unit 18, the phase difference AF processing unit 19, the external memory control unit 20, and the display control unit 22 are connected to each other by a control bus 24 and by a data bus 25 and are controlled in accordance with instructions from the system control unit 11.

Figure 2:
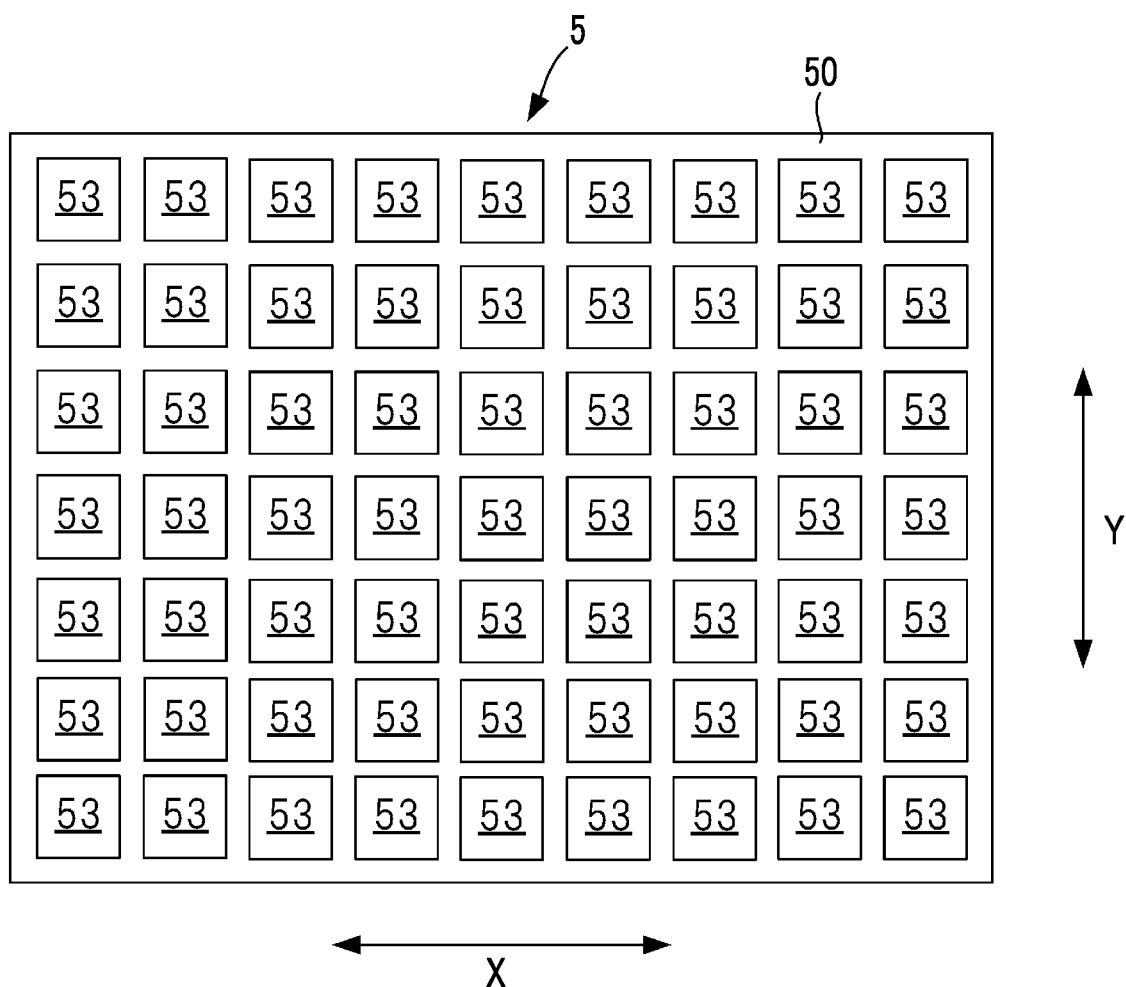
FIG. 2 is a schematic plan view illustrating an example of a configuration of an imaging element 5 mounted in the digital camera 100.

FIG. 2 is a schematic plan view illustrating an example of a configuration of the imaging element 5 mounted in the digital camera 100.

The imaging element 5 has a light-receiving surface 50 on which multiple pixels two-dimensionally arranged in a row direction X and in a column direction Y orthogonal to the row direction X are disposed.

In the example in FIG. 2, 63 focus detection areas (hereinafter, referred to as AF areas) 53 that are areas to be focused on (areas in which the subject image to be focused on is formed) are provided on the light-receiving surface 50.

In the digital camera 100, one or a plurality of consecutive AF areas 53 are selected from the 63 AF areas 53 illustrated in FIG. 2, and a focus control of focusing on the subject imaged by the selected AF area 53 is performed.

The AF areas 53 are areas including an imaging pixel and a phase difference detection pixel as a pixel. Only the imaging pixel is disposed in a part of the light-receiving surface 50 except the AF areas 53.

Figure 3:
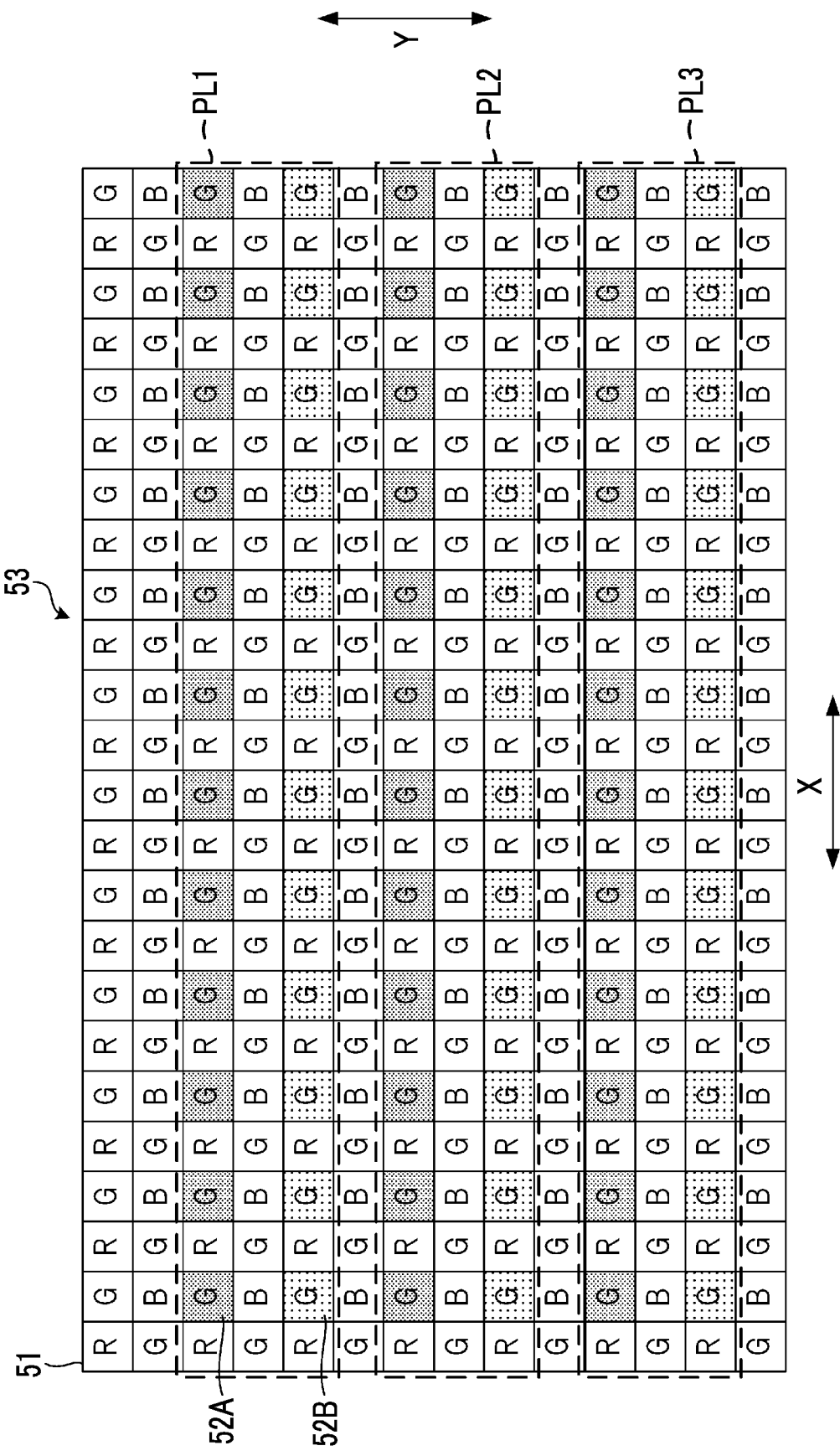
FIG. 3 is a partial enlarged view of one AF area 53 illustrated in FIG. 2.

FIG. 3 is a partial enlarged view of one AF area 53 illustrated in FIG. 2.

Pixels 51 (square blocks in the drawing) are two-dimensionally arranged in the AF area 53. Each pixel 51 includes a photoelectric conversion unit such as a photodiode and a color filter formed above the photoelectric conversion unit. Each pixel 51 may be configured to separate light based on a structure of the photodiode instead of using the color filter.

In FIG. 3, the pixel 51 (R pixel 51) including a color filter (R filter) that allows transmission of red light is designated by a character "R".

In FIG. 3, the pixel 51 (G pixel 51) including a color filter (G filter) that allows transmission of green light is designated by a character "G".

In FIG. 3, the pixel 51 (B pixel 51) including a color filter (B filter) that allows transmission of blue light is designated by a character "B". Arrangement of the color filters corresponds to Bayer arrangement over the light-receiving surface 50.

In the AF area 53, a part (hatched pixels in FIG. 3) of the G pixels 51 includes phase difference detection pixels 52A and 52B. In the example in FIG. 3, each G pixel 51 in any pixel row among pixel rows including the R pixels 51 and the G pixels 51 is the phase difference detection pixel 52A, and the G pixel 51 of the same color closest to the each G pixel 51 in the column direction Y is the phase difference detection pixel 52B.

The phase difference detection pixel 52A and the phase difference detection pixel 52B of the same color closest thereto in the column direction Y constitute a pair. However, arrangement of these phase difference detection pixels is merely an example, and other arrangements may be used. For example, a part of the G pixels 51 may be the phase difference detection pixel, and the phase difference detection pixel may be disposed in the R pixels 51 or in the B pixels 51.

The phase difference detection pixels 52A in the third pixel row from the top in FIG. 3 and the phase difference detection pixels 52B in the fifth pixel row from the top in FIG. 3 constitute a pair line PL1 composed of a plurality of the pairs arranged in the row direction X.

The phase difference detection pixels 52A in the seventh pixel row from the top in FIG. 3 and the phase difference detection pixels 52B in the ninth pixel row from the top in FIG. 3 constitute a pair line PL2 composed of a plurality of the pairs arranged in the row direction X.

The phase difference detection pixels 52A in the eleventh pixel row from the top in FIG. 3 and the phase difference detection pixels 52B in the thirteenth pixel row from the top in FIG. 3 constitute a pair line PL3 composed of a plurality of the pairs arranged in the row direction X.

Accordingly, the plurality of pair lines are arranged in the column direction Y in the AF area 53.

Figure 4:
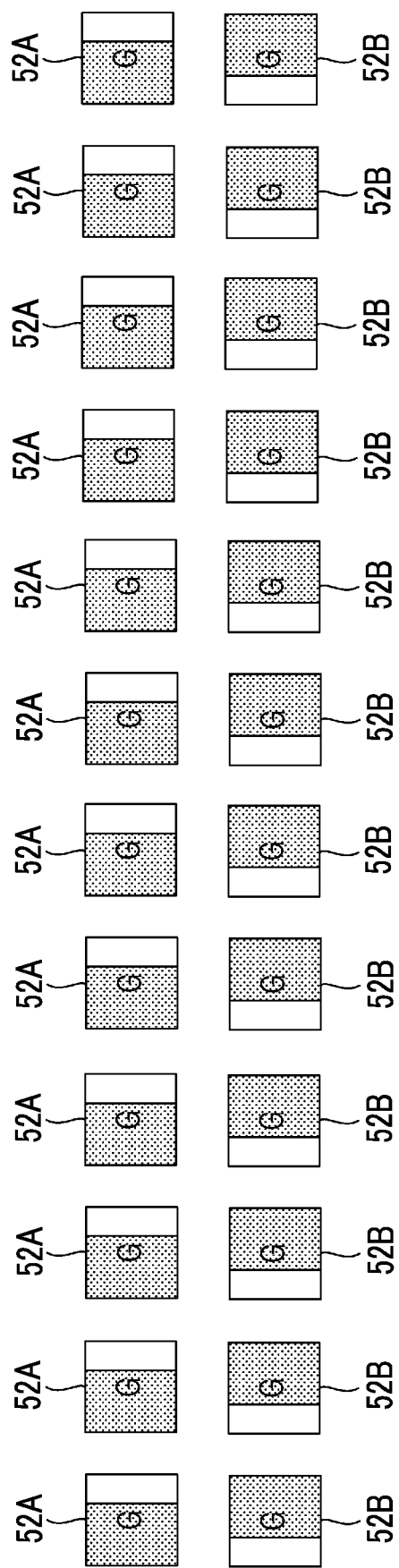
FIG. 4 is a diagram illustrating phase difference detection pixels constituting any pair line illustrated in FIG. 3.

FIG. 4 is a diagram illustrating the phase difference detection pixels constituting any pair line illustrated in FIG. 3.

Each phase difference detection pixel 52A is a first signal detection unit that receives a luminous flux which has passed through one divided region of a pupil region of the imaging lens 1 divided into two parts in the row direction X, and that detects a signal corresponding to an amount of received light.

Each phase difference detection pixel 52B is a second signal detection unit that receives a luminous flux which has passed through the other divided region of the pupil region, and that detects a signal corresponding to an amount of received light.

In the AF area 53, a plurality of the pixels 51 other than the phase difference detection pixels 52A and 52B are the imaging pixels. Each imaging pixel receives luminous fluxes that have passed through both of the two divided regions of the pupil region of the imaging lens 1, and detects a signal corresponding to an amount of received light.

A light shielding film is provided above the photoelectric conversion unit of each pixel 51, and an opening that defines an area of a light-receiving surface of the photoelectric conversion unit is formed in the light shielding film.

A center of the opening of each imaging pixel matches a center of the photoelectric conversion unit of each imaging pixel. On the other hand, a center of the opening (white parts in FIG. 4) of each phase difference detection pixel 52A is eccentric to one side (a left side) of a center of the photoelectric conversion unit of each phase difference detection pixel 52A.

In addition, a center of the opening (white parts in FIG. 4) of each phase difference detection pixel 52B is eccentric to the other side (a right side) of a center of the photoelectric conversion unit of each phase difference detection pixel 52B.

Figure 5:
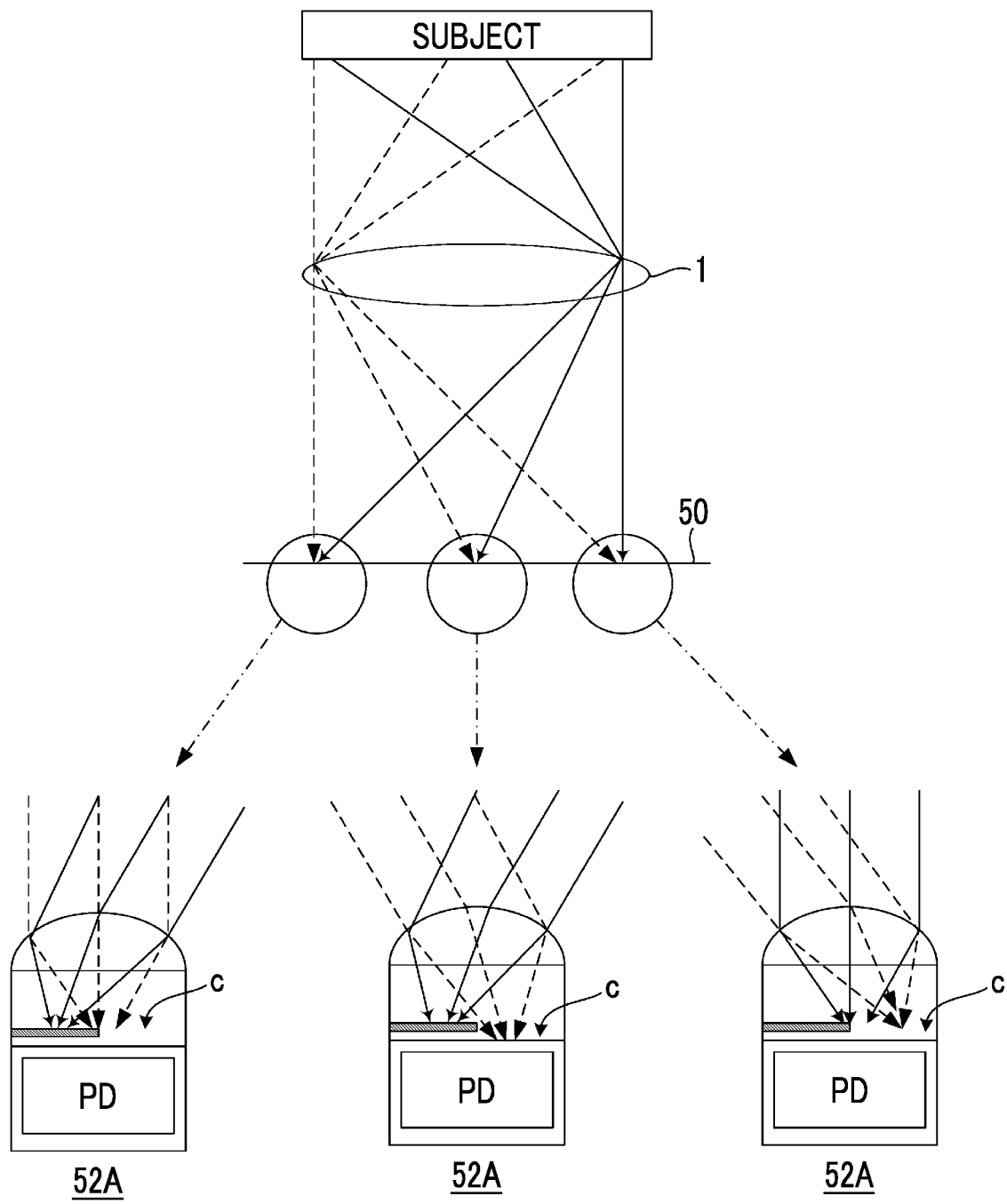
FIG. 5 is a diagram illustrating a cross section configuration of a phase difference detection pixel 52A.

FIG. 5 is a diagram illustrating a cross section configuration of each phase difference detection pixel 52A. As illustrated in FIG. 5, in the phase difference detection pixel 52A, an opening c is eccentric to one side (right) of a photoelectric conversion unit PD.

As illustrated in FIG. 5, by covering a side of the photoelectric conversion unit PD with the light shielding film, the phase difference detection pixel 52A can be selectively shielded from light incident from a direction opposite to a direction of the side covered with the light shielding film.

With this configuration, it is possible to detect a phase difference in the row direction X in an image captured by each of two pixel groups that include a pixel group consisting of the phase difference detection pixels 52A constituting any pair line and a pixel group consisting of the phase difference detection pixels 52B constituting the pair line.

A pixel configuration of the imaging element 5 is not limited to the configurations illustrated in FIG. 2 to FIG. 5.

For example, a configuration in which all pixels included in the imaging element 5 are the imaging pixels and in which each imaging pixel is divided into two parts in the row direction X to use one divided part as the phase difference detection pixel 52A and to use the other divided part as the phase difference detection pixel 52B may be used.

Figure 6:
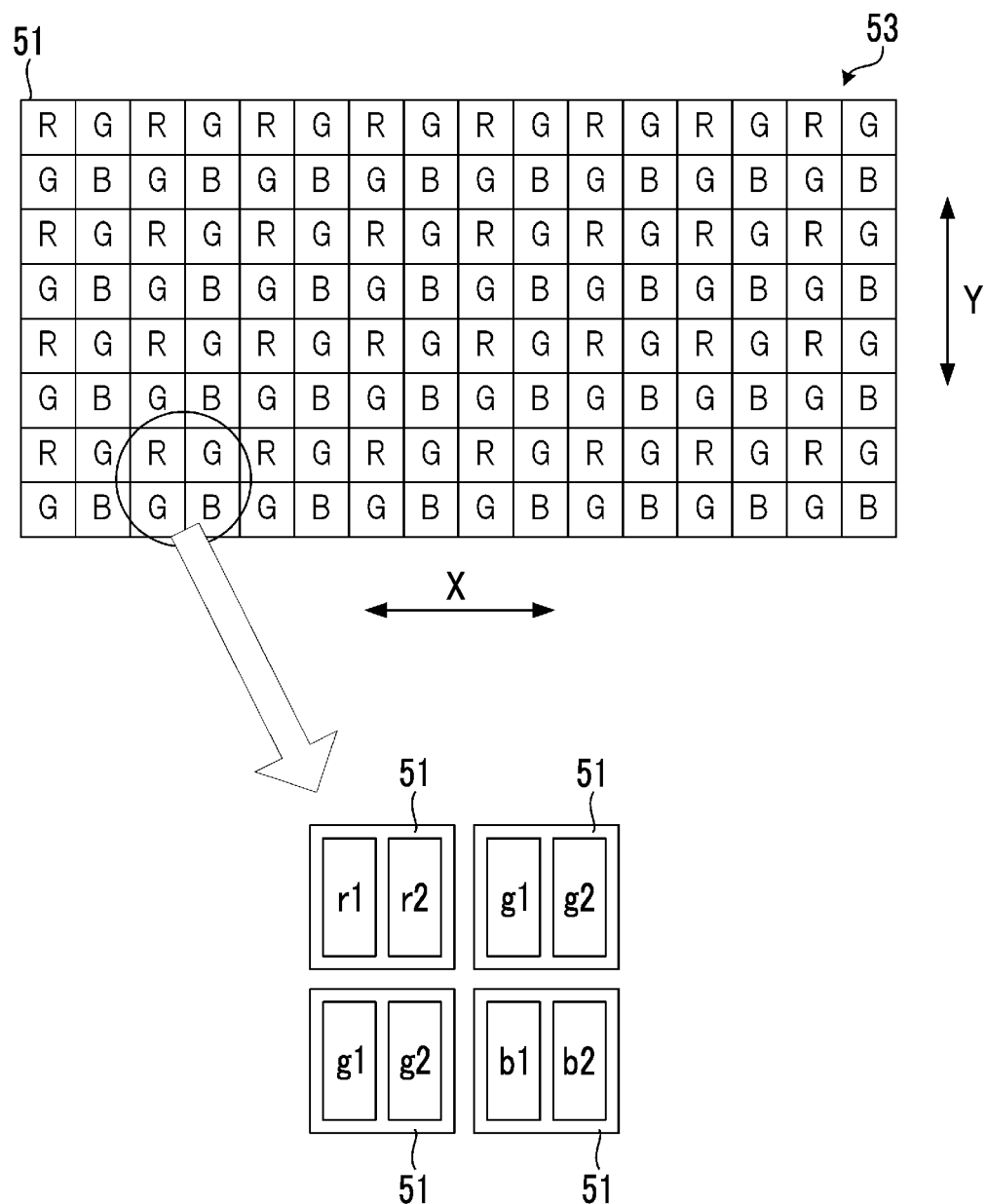
FIG. 6 is a diagram illustrating a configuration in which all pixels 51 included in the imaging element 5 are imaging pixels and in which each pixel 51 is divided into two parts.

FIG. 6 is a diagram illustrating a configuration in which all pixels 51 included in the imaging element 5 are the imaging pixels and in which each pixel 51 is divided into two parts.

In the configuration in FIG. 6, each pixel 51 designated by R in the imaging element 5 is divided into two parts, and the two divided parts are used as a phase difference detection pixel r1 and a phase difference detection pixel r2, respectively.

In addition, each pixel 51 designated by G in the imaging element 5 is divided into two parts, and the two divided parts are used as a phase difference detection pixel g1 and a phase difference detection pixel g2, respectively.

Furthermore, each pixel 51 designated by B in the imaging element 5 is divided into two parts, and the two divided parts are used as a phase difference detection pixel b1 and a phase difference detection pixel b2, respectively.

In this configuration, each of the phase difference detection pixels r1, g1, and b1 is the first signal detection unit, and each of the phase difference detection pixels r2, g2, and b2 is the second signal detection unit.

In the configuration example in FIG. 6, in a case where signals of the first signal detection unit and the second signal detection unit included in one pixel 51 are added, a normal imaging signal not having a phase difference is obtained. That is, in the configuration in FIG. 6, all pixels can be used as both of the phase difference detection pixel and the imaging pixel. In addition, in the configuration example in FIG. 6, it is possible to improve a degree of freedom in setting a size and a shape of the AF area.

The system control unit 11 selectively performs any of the focus control based on the phase difference AF system and the focus control based on the contrast system.

The phase difference AF processing unit 19, in accordance with instructions from the system control unit 11, calculates a phase difference that is a relative misregistration amount between two images formed by the pair of luminous fluxes, using a detection signal group read out from the phase difference detection pixels 52A and from the phase difference detection pixels 52B in one or the plurality of AF areas 53 selected from the 63 AF areas 53 by a user operation or the like.

The phase difference AF processing unit 19 obtains a focus adjustment state of the imaging lens 1 based on the phase difference. Here, the focus adjustment state is the defocus data including a defocus amount and a defocus direction. The defocus amount is a difference between the focus position and the current position of the focus lens and is a value indicating how much the focus lens is to be moved to set the focus lens to the focus position. The defocus direction indicates in which direction the focus lens is to be moved. A driving amount and a driving direction of the focus lens can be calculated from the defocus data and from data of the lens at the moment.

The system control unit 11 performs the focus control based on the phase difference AF system that uses a result of a correlation operation, by driving the focus lens based on the defocus data.

The contrast AF processing unit 18 analyzes a captured image captured by the imaging element 5 and determines the focus position of the imaging lens 1 based on the contrast AF system.

That is, the contrast AF processing unit 18 obtains a contrast (a difference between light and dark) of the captured image obtained for each position (a plurality of positions) after movement while moving a position of the focus lens of the imaging lens 1 under control of the system control unit 11. The position of the focus lens at which the highest contrast is obtained is determined as a highest-contrast focus position.

The system control unit 11 performs the focus control based on the contrast AF system that uses the contrast of the captured image, by driving the focus lens based on the highest-contrast focus position determined by the contrast AF processing unit 18.

In addition, the digital camera 100 may be equipped with a continuous AF mode in which the focus control of focusing on the subject is continuously performed a plurality of times. For example, the digital camera 100 continuously performs the focus control of focusing on the subject a plurality of times while displaying a live preview image (live view image) that is an image showing the captured image obtained by continuous imaging via the imaging element 5 in real time.

Figure 7:
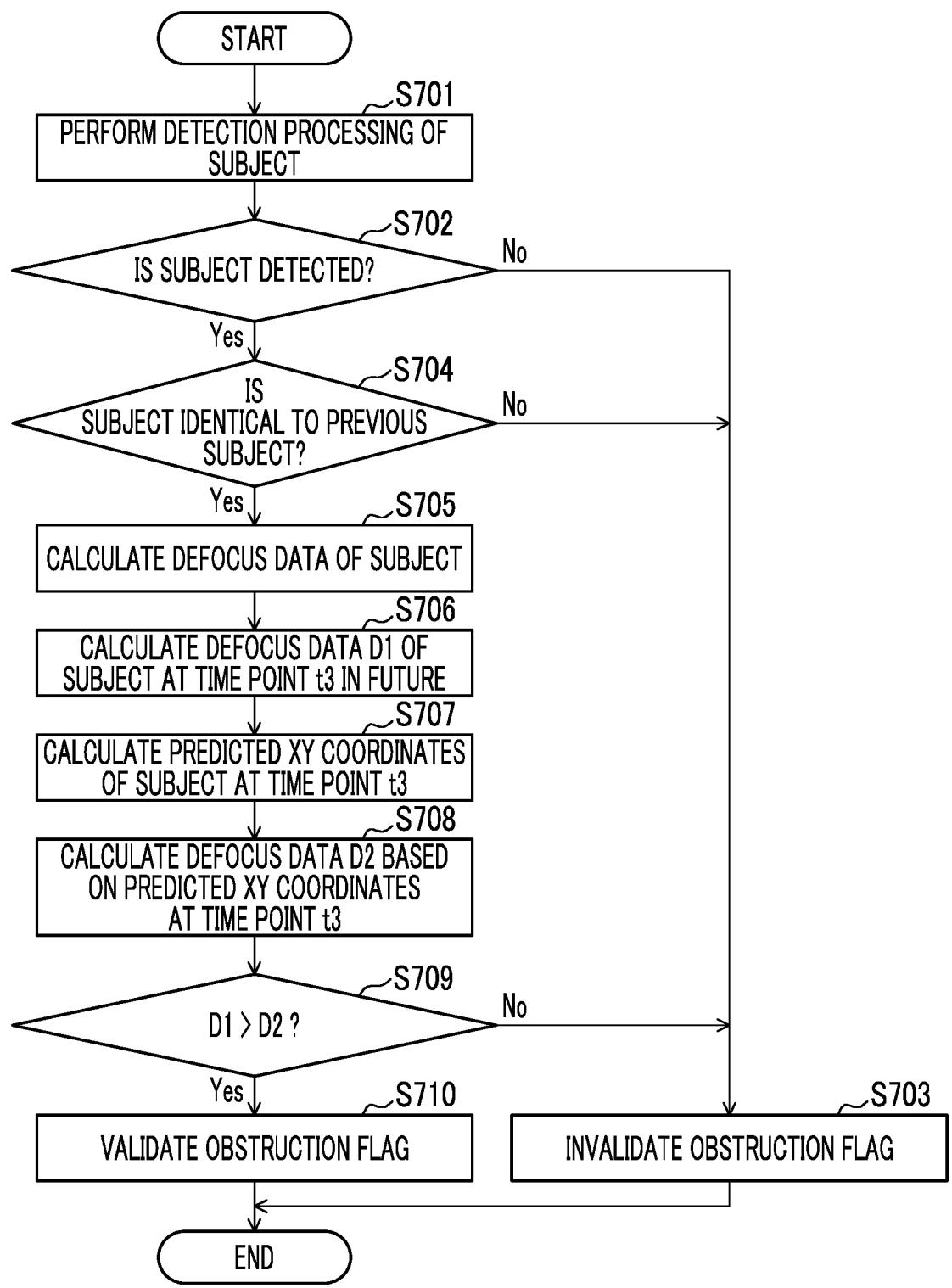
FIG. 7 is a flowchart illustrating an example of obstruction detection processing via the digital camera 100.

FIG. 7 is a flowchart illustrating an example of obstruction detection processing via the digital camera 100. For example, the digital camera 100 repeatedly executes the processing illustrated in FIG. 7 as the obstruction detection processing of detecting obstruction of the main subject. For example, this processing is executed by at least any of the system control unit 11 or the phase difference AF processing unit 19.

Here, obstruction refers to a state where, in a case where one subject is in an imaging direction (forward) of the digital camera 100, the one subject cannot be imaged by the digital camera 100 because another object that is present between the one subject and the digital camera 100 causes the one subject to be not seen from the digital camera 100.

First, the digital camera 100 performs detection processing of a subject (step S701). The subject may be a subject designated by the user or may be a subject automatically detected by the digital camera 100.

Next, the digital camera 100 determines whether or not a subject is detected in step S701 (step S702). In a case where a subject is not detected (step S702: No), the digital camera 100 invalidates an obstruction flag (step S703) and ends the series of processes. The obstruction flag is information indicating whether or not a subject that is a moving object is obstructed, and is stored in a memory (for example, the main memory 16) of the digital camera 100.

In step S702, in a case where a subject is detected (step S702: Yes), the digital camera 100 determines whether or not the subject detected in immediately previous step S701 is a subject identical to the subject detected in previous step S701 (step S704). For example, the determination as to whether or not the detected subjects are identical to each other is performed based on similarity between the detected subjects. In a case where the subjects are not identical (step S704: No), the subject is currently not recognized as a moving object. Thus, the digital camera 100 transitions to step S703 to invalidate the obstruction flag.

In step S704, in a case where the subjects are identical (step S704: Yes), the digital camera 100 calculates the defocus data of the subject detected in immediately previous step S701 (step S705). For example, the digital camera 100 calculates the defocus data based on phase difference information of a subject area in which the subject is detected in immediately previous step S701 in the latest pixel data obtained by the imaging element 5.

As described above, the defocus data consists of the defocus amount and the defocus direction. Accuracy of the defocus data of the subject is not particularly limited. For example, the defocus data of the subject may be information about binary values of "far" and "close". In phase difference AF, in a case where the defocus data is known, the distance between the subject and the digital camera 100 can be obtained as the defocus data using the data of the lens at the moment and the defocus data. Even in contrast AF, the defocus data can be calculated from the focus position.

Next, the digital camera 100 calculates defocus data D1 that is a prediction value of the defocus data of the subject at time point t3 in the future, based on the defocus data calculated in immediately previous step S705 and on the defocus data calculated for the identical subject in step S705 in the past (step S706). For example, time point t3 in the future is a time point of subsequent lens driving (driving of the focus lens of the imaging lens 1).

Next, the digital camera 100 calculates a predicted XY coordinate that is a prediction value of an XY coordinate of the subject detected in immediately previous step S701, at time point t3 in the future (step S707). The XY coordinate is a positional coordinate indicating a position in a two-dimensional image.

Next, the digital camera 100 calculates defocus data D2 that is the defocus data based on the predicted XY coordinate calculated in step S707 (step S708). As the defocus data D2, for example, the digital camera 100 calculates the defocus data based on the phase difference information of a part at the predicted XY coordinate in the latest pixel data obtained by the imaging element 5.

Next, the digital camera 100 determines whether or not the focus position based on the defocus data D1 calculated in step S706 is further than the focus position based on the defocus data D2 calculated in step S708 (described as "D1>D2?" in FIG. 7) (step S709).

In step S709, in a case where the focus position based on the defocus data D1 is not further than the focus position based on the defocus data D2 (step S709: No), it can be predicted that the subject detected in immediately previous step S701 is not obstructed by an obstruction at time point t3. In this case, the digital camera 100 transitions to step S703 to invalidate the obstruction flag.

In step S709, in a case where the focus position based on the defocus data D1 is further than the focus position based on the defocus data D2 (step S709: Yes), it can be predicted that the subject detected in immediately previous step S701 is obstructed by an obstruction at time point t3. In this case, the digital camera 100 validates the obstruction flag (step S710) and ends the series of processes.

Figure 8:
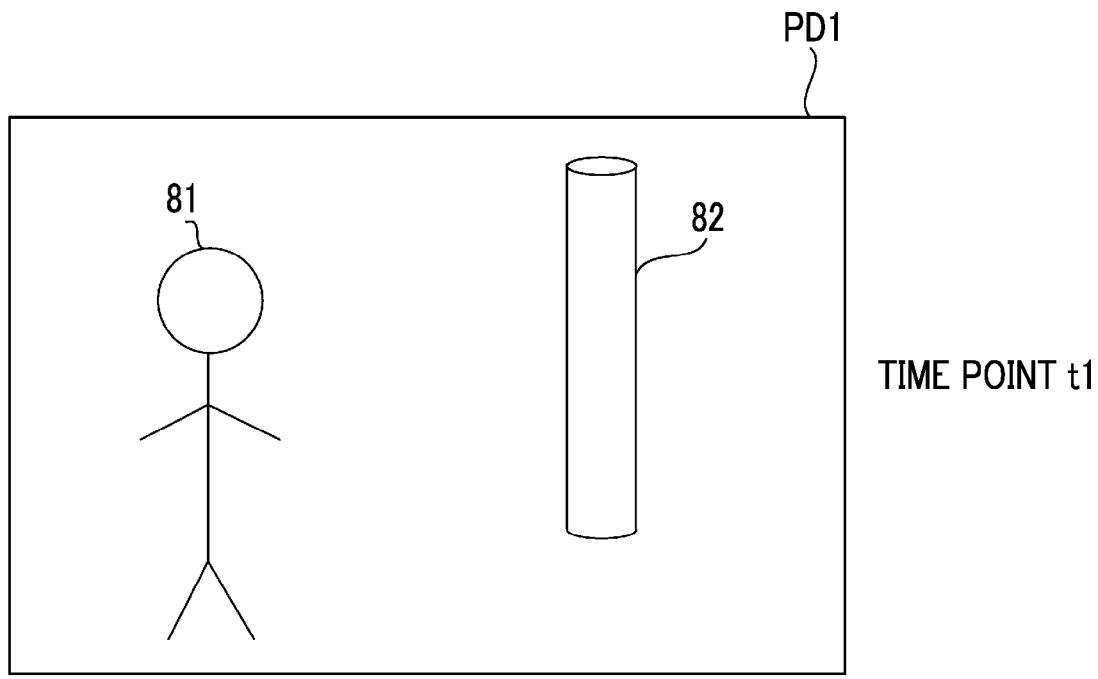
FIG. 8 is a diagram (Part 1) illustrating an example of obstruction detection of a subject by the digital camera 100.
Figure 9:
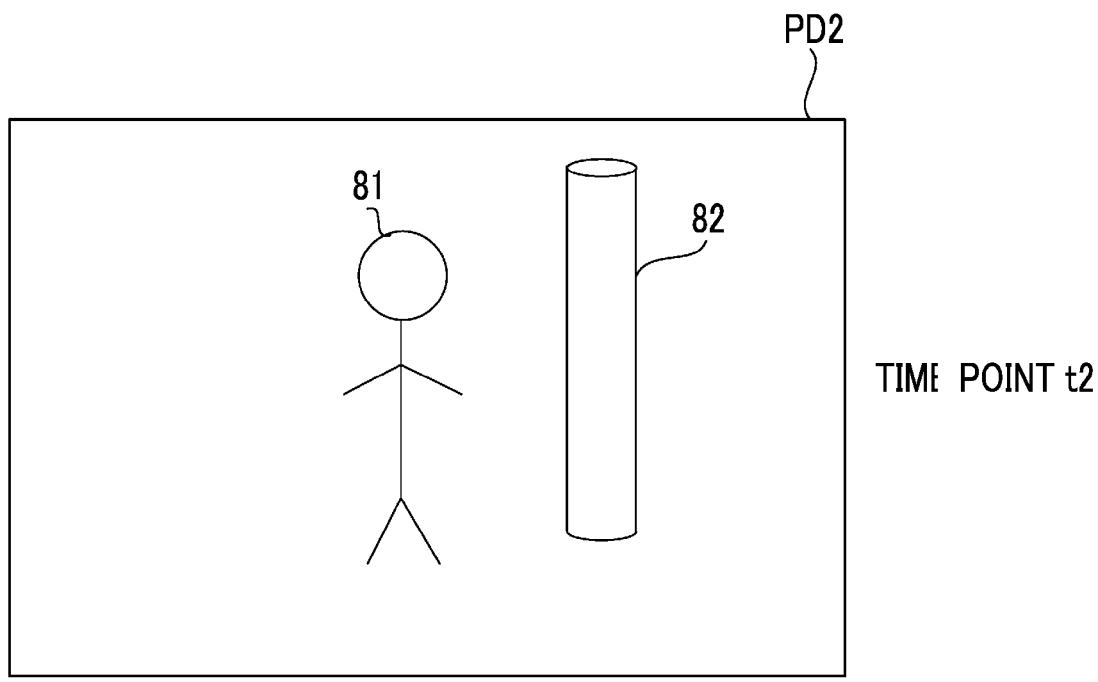
FIG. 9 is a diagram (Part 2) illustrating an example of the obstruction detection of the subject by the digital camera 100.
Figure 10:
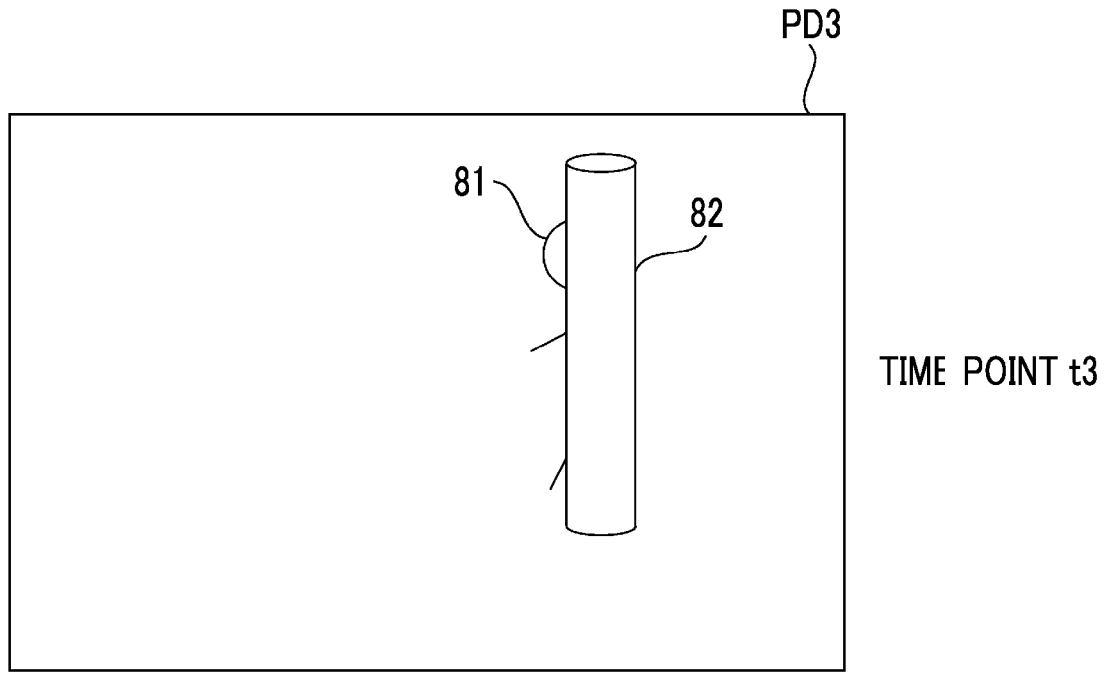
FIG. 10 is a diagram (Part 3) illustrating an example of the obstruction detection of the subject by the digital camera 100.
Figure 11:
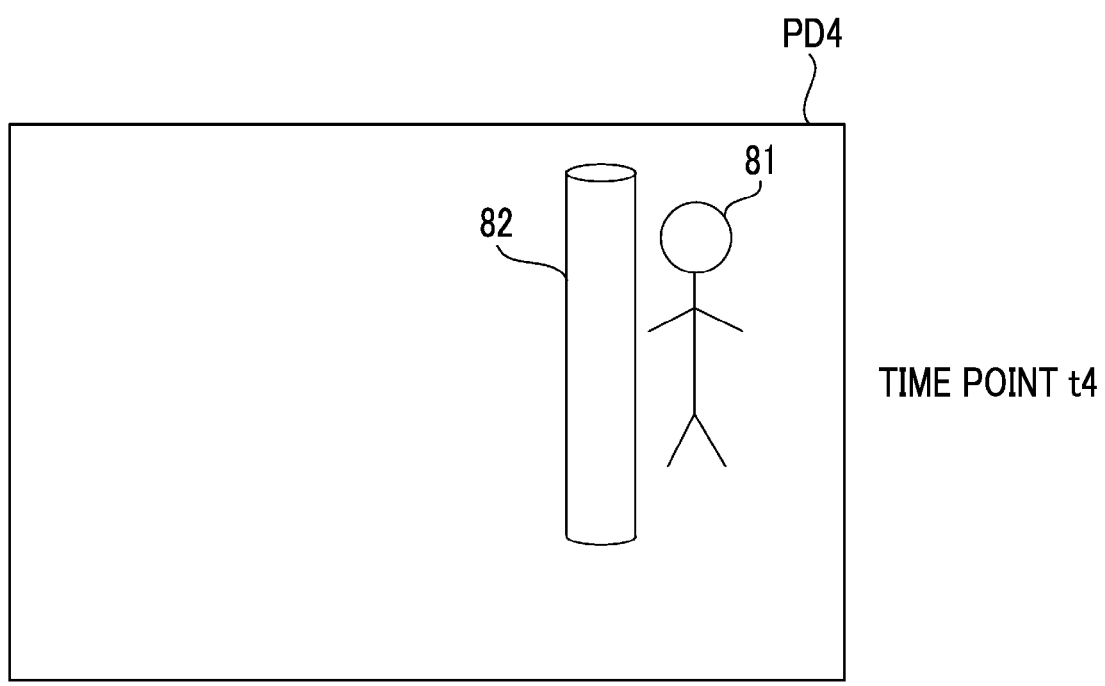
FIG. 11 is a diagram (Part 4) illustrating an example of the obstruction detection of the subject by the digital camera 100.

FIG. 8 to FIG. 11 are diagrams illustrating an example of obstruction detection of the subject by the digital camera 100. Pixel data PD1 illustrated in FIG. 8 is pixel data obtained by the imaging element 5 at time point t1. Pixel data PD2 illustrated in FIG. 9 is pixel data obtained by the imaging element 5 at time point t2 after time point t1. Pixel data PD3 illustrated in FIG. 10 is pixel data obtained by the imaging element 5 at time point t3 after time point t2. Pixel data PD4 illustrated in FIG. 11 is pixel data obtained by the imaging element 5 at time point t4 after time point t3. In FIG. 8 to FIG. 11, the pixel data PD1 to PD4 after demosaicing are illustrated.

A moving object 81 is a moving object (in this example, a person) present in an imaging region of the digital camera 100 at time points t1 to t4. For example, it is assumed that the digital camera 100 has detected the moving object 81 as a subject through the detection processing of the subject based on the pixel data PD1 and PD2. In the examples in FIG. 8 to FIG. 11, the moving object 81 is moving from the front on the left toward the rear on the right in a view from the digital camera 100.

An object 82 is a stationary object (in this example, a utility pole) present in the imaging region of the digital camera 100 at time points t1 to t4. For example, at time point t3, the moving object 81 is positioned behind the object 82 in a view from the digital camera 100. Consequently, at least a part of the moving object 81 is obstructed by the object 82. In addition, at time point t4, the moving object 81 is positioned on the right side of the object 82 in a view from the digital camera 100. Consequently, obstruction of the moving object 81 by the object 82 is eliminated.

Processing of the digital camera 100 at time point t2 will be described as an example. Here, it is assumed that the digital camera 100 has already detected the moving object 81 as a subject at time point t1 and has already calculated the defocus data of the moving object 81 at time point t1. The digital camera 100 detects the moving object 81 again as a subject at time point t2 and calculates the defocus data of the moving object 81 at time point t2.

Next, the digital camera 100 calculates the defocus data D1 of the moving object 81 at time point t3 that is a time point in the future. For example, the digital camera 100 calculates the defocus data D1 of the moving object 81 at time point t3 based on calculation results of the defocus data of the moving object 81 at time points t1 and t2.

In addition, the digital camera 100 calculates the predicted XY coordinate of the moving object 81 at time point t3. For example, the digital camera 100 calculates the predicted XY coordinate of the moving object 81 at time point t3 based on detection results of the moving object 81 at time points t1 and t2.

Next, the digital camera 100 calculates the defocus data D2 using the calculated predicted XY coordinate. For example, the digital camera 100 calculates the defocus data D2 based on the phase difference information of the part at the calculated predicted XY coordinate in the pixel data PD2 obtained by the imaging element 5 at time point t2.

The digital camera 100 compares the calculated defocus data D1 and D2. In the examples in FIG. 8 to FIG. 11, the moving object 81 is positioned behind the object 82 at time point t3. Thus, the focus position based on the defocus data D1 is further than the focus position based on the defocus data D2. Accordingly, the digital camera 100 predicts that the moving object 81 is obstructed by the object 82 at time point t3, and validates the obstruction flag.

The digital camera 100 detects the moving object 81 present in the pixel data PD1 and PD2 (a plurality of pieces of pixel data) obtained by the imaging element 5 at time points t1 and t2 (different time points). In addition, the digital camera 100 calculates the defocus data D1 (a first distance) that is a predicted distance to the moving object 81 at time point t3 in the future. In addition, the digital camera 100 calculates the defocus data D2 (a second distance) that is a distance to the object 82 present at the predicted XY coordinate (predicted positional coordinate) of the moving object 81 at time point t3 in the future.

In addition, the digital camera 100 performs detection processing of obstruction of the moving object 81 by the object 82 at time point t3 in the future based on a result of comparison between the defocus data D1 and D2. Specifically, in a case where the focus position based on the defocus data D1 is further than the focus position based on the defocus data D2, the digital camera 100 determines that the moving object 81 is obstructed by the object 82 at time point t3. The digital camera 100 performs an imaging control based on a result of this detection processing. Accordingly, it is possible to suppress erroneous operation of the imaging control caused by obstruction of the moving object 81 which is the subject by the object 82.

For example, the digital camera 100 calculates the predicted XY coordinate of the moving object 81 at time point t3 in the future based on XY coordinates (each positional coordinate) of the moving object 81 in the pixel data PD1 and PD2 (the plurality of pieces of pixel data). The predicted XY coordinate of the moving object 81 at time point t3 in the future is not limited to be calculated based on the pixel data PD1 and PD2 and can also be calculated based on the XY coordinates of the moving object 81 in any plurality of pieces of pixel data obtained by the imaging element 5 before time point t3 in the future.

In addition, for example, the digital camera 100 calculates the defocus data D1 (the first distance) that is the predicted distance to the moving object 81 at time point t3 in the future, based on detection results of the distance to the moving object 81 at time points t1 and t2 (a plurality of time points). The defocus data D1 is not limited to time points t1 and t2 and can also be calculated based on detection results of the distance to the moving object 81 at any plurality of time points before time point t3 in the future.

In addition, the digital camera 100 calculates the defocus data of the object 82 at time point t2 as the defocus data D2 (the second distance) that is the distance to the object 82 present at the predicted XY coordinate of the moving object 81 at time point t3 in the future. The defocus data D2 is not limited to the defocus data of the object 82 at time point t2 and may be the defocus data of the object 82 at any time point before time point t3.

Figure 12:
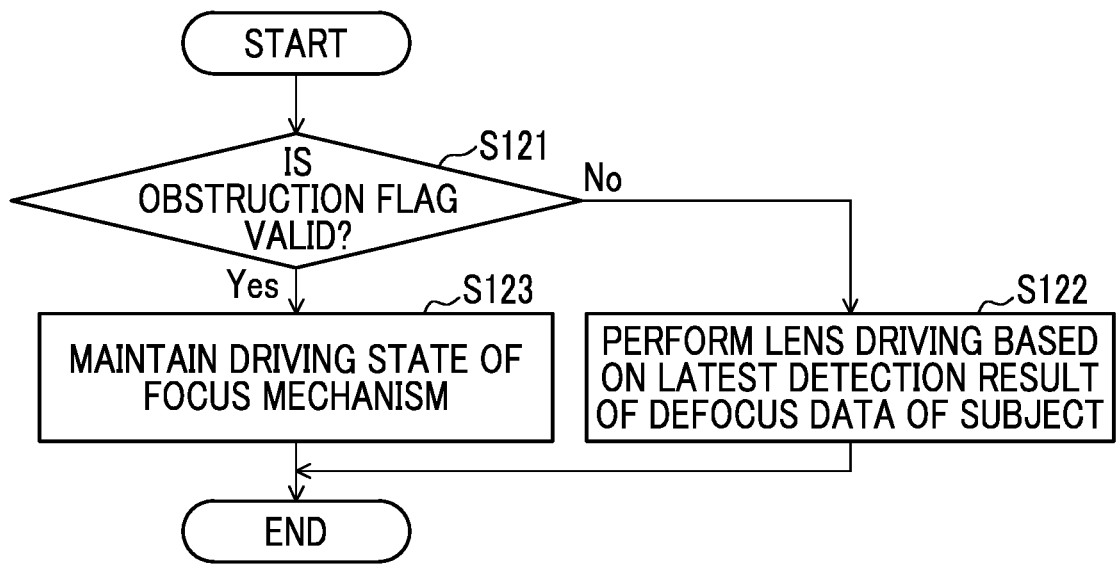
FIG. 12 is a flowchart illustrating Specific Example 1 of an imaging control via the digital camera 100 based on a detection result of obstruction of a moving object 81.

FIG. 12 is a flowchart illustrating Specific Example 1 of the imaging control via the digital camera 100 based on a detection result of obstruction of the moving object 81. For example, the digital camera 100 repeatedly executes the processing illustrated in FIG. 12 together with the processing illustrated in FIG. 7. For example, the processing in FIG. 12 is executed by at least any of the system control unit 11 or the phase difference AF processing unit 19. In addition, for example, the processing in FIG. 12 is executed for each timing of lens driving (driving of the focus lens of the imaging lens 1).

First, the digital camera 100 determines whether or not the obstruction flag is valid (step S121). In a case where the obstruction flag is not valid (step S121: No), it can be estimated that the moving object 81 which is the subject is not obstructed by the object 82 at a timing of the current lens driving. In this case, the digital camera 100 performs lens driving based on the latest detection result of the defocus data of the subject (step S122) and ends the series of processes. Specifically, the digital camera 100 drives the focus lens of the imaging lens 1 based on a detection result of the defocus data based on the phase difference information of a part at the current XY coordinate of the subject in the latest pixel data obtained by the imaging element 5.

In step S121, in a case where the obstruction flag is valid (step S121: Yes), the digital camera 100 can estimate that the moving object 81 which is the subject is obstructed by the object 82 at the timing of the current lens driving. In this case, the digital camera 100 maintains a driving state of the focus lens of the imaging lens 1 (step S123) and ends the series of processes. By performing step S123, lens driving based on the latest detection result of the defocus data of the subject can be stopped.

For example, since the obstruction flag is valid at time point t3 in the examples illustrated in FIG. 8 to FIG. 11, the digital camera 100, for example, maintains a driving state based on the pixel data obtained at time point t2 as the driving state of the focus lens of the imaging lens 1.

As described above, in a case where obstruction of the moving object 81 at time point t3 is detected, the digital camera 100 stops driving of the focus lens of the imaging lens 1 based on the detection result of the defocus data of the moving object 81 based on the latest pixel data at time point t3. Accordingly, it is possible to suppress erroneous operation of focusing on the object 82 that obstructs (shields) the moving object 81.

In addition, in a case where driving of the focus lens of the imaging lens 1 based on the detection result of the defocus data of the moving object 81 at time point t3 is stopped by detecting obstruction of the moving object 81 at time point t3, the digital camera 100 may calculate time point t4 that is a predicted time point at which obstruction of the moving object 81 is eliminated after time point t3. For example, the digital camera 100 calculates time point t4 at which the XY coordinate of the moving object 81 deviate from XY coordinate of the object 82 after time point t3 based on detection results of the XY coordinates of the moving object 81 at time points t1 and t2. The digital camera 100 resumes driving of the imaging lens 1 of the imaging optical system based on the detection result of the defocus data of the moving object 81 at time point t4. Accordingly, even in a case where driving of the focus lens of the imaging lens 1 based on the detection result of the defocus data of the moving object 81 is stopped, driving of the focus lens of the imaging lens 1 based on the detection result of the defocus data of the moving object 81 can be resumed at time point t4 at which obstruction of the moving object 81 is eliminated.

In addition, for example, the digital camera 100 may calculate the predicted XY coordinate of the moving object 81 at time point t4 at which obstruction of the moving object 81 is eliminated, based on the detection results of the XY coordinates of the moving object 81 at time points t1 and t2 and perform subject detection processing based on data corresponding to the calculated predicted XY coordinate of the moving object 81 at time point t4 in the pixel data obtained by the imaging element 5 at time point t4. Accordingly, an area targeted by the subject detection processing based on the pixel data obtained at time point t4 at which obstruction of the moving object 81 is eliminated can be narrowed down. Thus, it is possible to shorten a processing time required for the subject detection processing. In addition, it is possible to improve accuracy of the subject detection processing.

Figure 13:
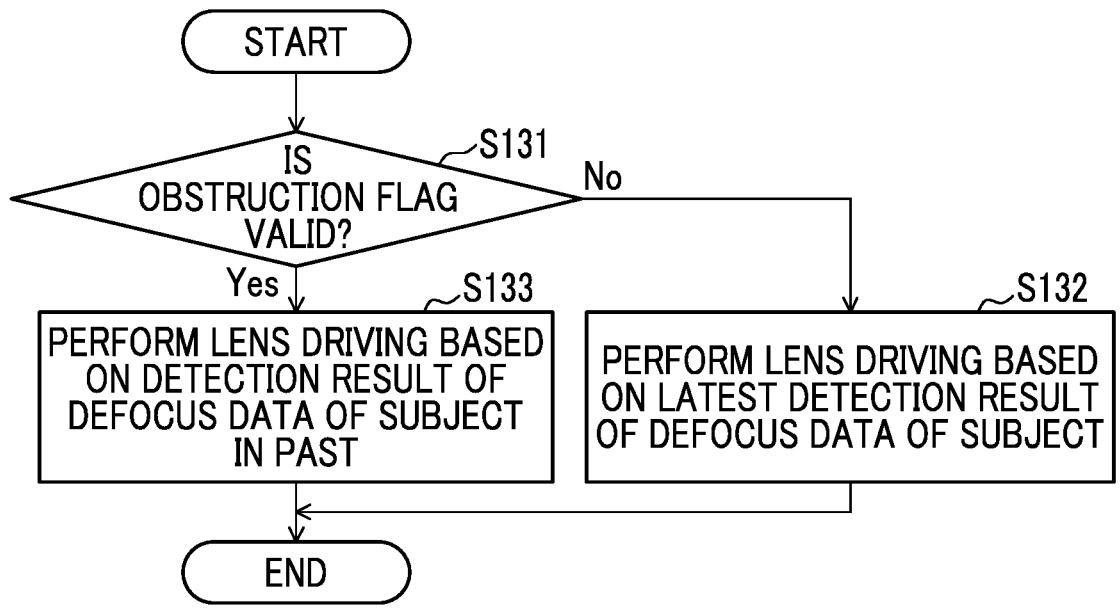
FIG. 13 is a flowchart illustrating Specific Example 2 of the imaging control via the digital camera 100 based on the detection result of obstruction of the moving object 81.

FIG. 13 is a flowchart illustrating Specific Example 2 of the imaging control via the digital camera 100 based on the detection result of obstruction of the moving object 81. For example, the digital camera 100 may repeatedly execute the processing illustrated in FIG. 13 together with the processing illustrated in FIG. 7. For example, the processing in FIG. 13 is executed by at least any of the system control unit 11 or the phase difference AF processing unit 19. In addition, for example, the processing in FIG. 12 is executed at each timing of lens driving.

First, the digital camera 100 determines whether or not the obstruction flag is valid (step S131). In a case where the obstruction flag is not valid (step S131: No), the digital camera 100 transitions to step S132. Step S132 is the same as step S122 illustrated in FIG. 12.

In step S131, in a case where the obstruction flag is valid (step S131: Yes), the digital camera 100, instead of performing lens driving based on the latest detection result of the defocus data of the subject, performs lens driving based on detection results of the defocus data of the subject at a plurality of time points in the past (step S133) and ends the series of processes.

For example, the obstruction flag is valid at time point t3 in the examples illustrated in FIG. 8 to FIG. 11. Thus, the digital camera 100 calculates the prediction value of the defocus data of the moving object 81 at time point t3 based on the phase difference information of each pixel data obtained by the imaging element 5 at time points t1 and t2 and drives the focus lens of the imaging lens 1 based on the calculated prediction value of the defocus data.

As described above, in a case where obstruction of the moving object 81 at time point t3 is detected, the digital camera 100 may drive a focus mechanism of the imaging lens 1 at time point t3 based on the detection results of the defocus data of the moving object 81 at a plurality of time points before time point t3. Accordingly, it is possible to continue the focus control even at a time point at which the moving object 81 is obstructed. The plurality of time points before time point t3 are not limited to time points t1 and t2.

Figure 14:
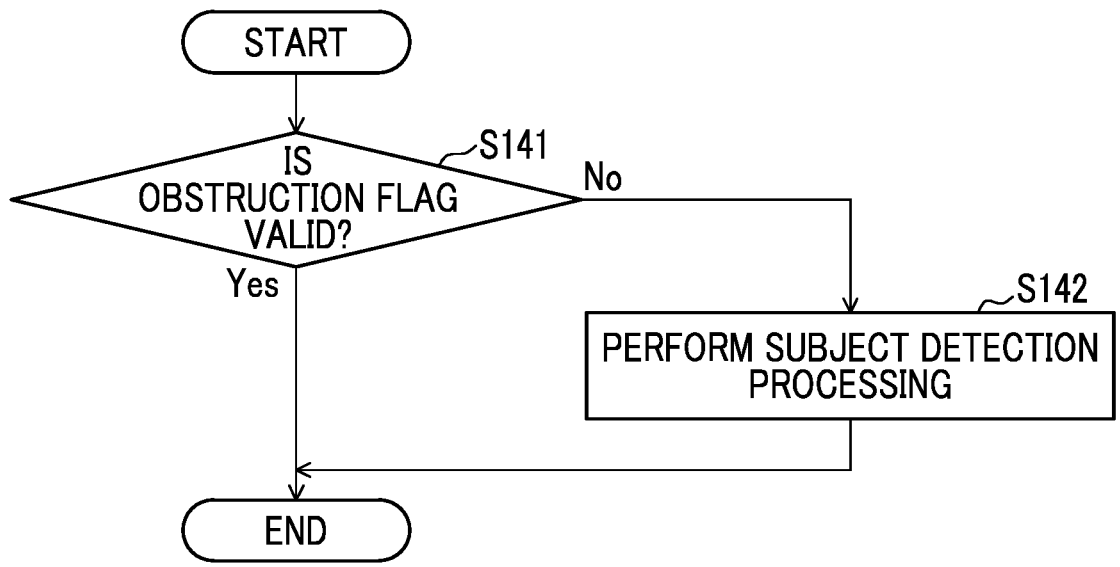
FIG. 14 is a flowchart illustrating Specific Example 3 of the imaging control via the digital camera 100 based on the detection result of obstruction of the moving object 81.

FIG. 14 is a flowchart illustrating Specific Example 3 of the imaging control via the digital camera 100 based on the detection result of obstruction of the moving object 81. For example, the digital camera 100 may repeatedly execute the processing illustrated in FIG. 14 together with the processing illustrated in FIG. 7. For example, the processing in FIG. 14 is executed by the system control unit 11. In addition, for example, the processing in FIG. 14 is executed at each subject detection timing. Each subject detection timing may be a timing at which the pixel data is obtained by the imaging element 5 or may be a timing at which there are processing resources for executing the subject detection processing among timings at which the pixel data is obtained by the imaging element 5.

First, the digital camera 100 determines whether or not the obstruction flag is valid (step S141). In a case where the obstruction flag is not valid (step S141: No), the digital camera 100 performs the subject detection processing including the detection processing of the subject based on the latest pixel data (step S142) and ends the series of processes. The subject detection processing in step S142 is the processing illustrated in FIG. 7 as an example. In step S141, in a case where the obstruction flag is valid (step S141: Yes), the digital camera 100 does not perform the subject detection processing and ends the series of processes.

As described above, the digital camera 100 may execute the subject detection processing based on the pixel data obtained by the imaging element 5 while the obstruction flag is valid, and stop the subject detection processing based on the pixel data obtained by the imaging element 5 while the obstruction flag is invalid (for example, at time point t3). Accordingly, it is possible to suppress erroneous operation such as erroneously determining that the moving object 81 is not present anymore based on obstruction of the moving object 81 which is the subject by the object 82. In addition, it is possible to suppress power consumption by stopping the subject detection processing. The subject detection processing may include tracking processing of tracking movement of a detected subject in addition to processing of newly detecting a subject.

Figure 15:
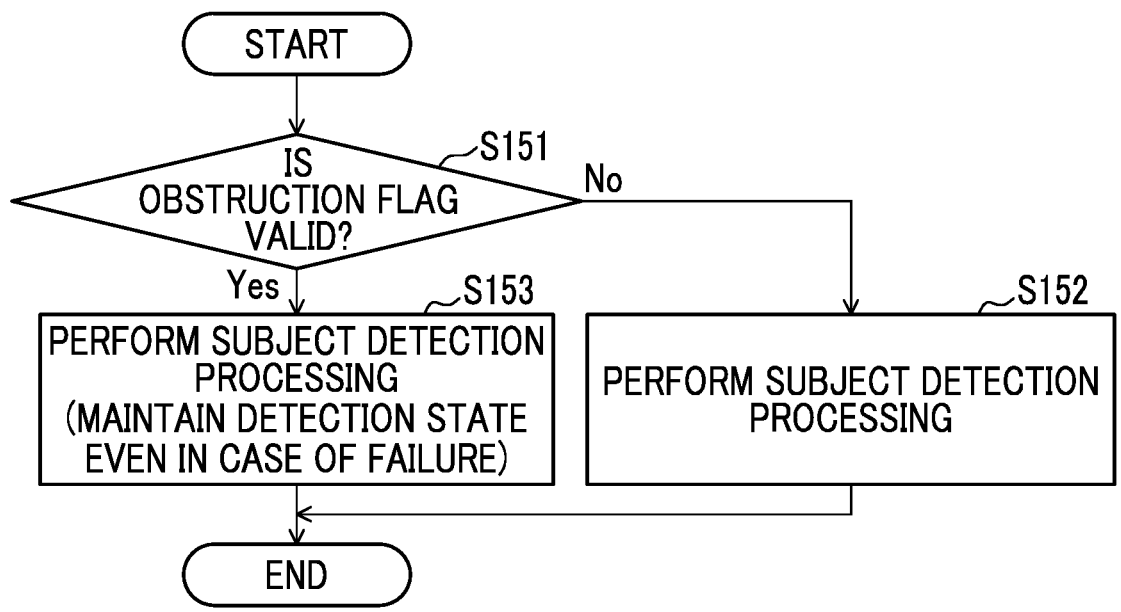
FIG. 15 is a flowchart illustrating Specific Example 4 of the imaging control via the digital camera 100 based on the detection result of obstruction of the moving object 81.

FIG. 15 is a flowchart illustrating Specific Example 4 of the imaging control via the digital camera 100 based on the detection result of obstruction of the moving object 81. For example, the digital camera 100 may repeatedly execute the processing illustrated in FIG. 15 together with the processing illustrated in FIG. 7. For example, the processing in FIG. 15 is executed by the system control unit 11. In addition, for example, the processing in FIG. 15 is executed at each subject detection timing.

First, the digital camera 100 determines whether or not the obstruction flag is valid (step S151). In a case where the obstruction flag is not valid (step S151: No), the digital camera 100 transitions to step S152. Step S152 is the same as step S142 illustrated in FIG. 14.

In step S151, in a case where the obstruction flag is valid (step S151: Yes), the digital camera 100 performs the subject detection processing (step S152) and ends the series of processes. Even in a case where the subject detection processing in step S152 results in a failure, the digital camera 100 maintains a detection state of the subject detected by the subject detection processing based on the pixel data obtained by the imaging element 5 before the failure.

For example, in the examples illustrated in FIG. 8 to FIG. 11, even in a case where the moving object 81 detected from the pixel data obtained at time points t1 and t2 cannot be detected from the pixel data obtained at time point t3 at which the moving object 81 is obstructed, the digital camera 100 does not determine that the moving object 81 is not present anymore, and continues the processing of tracking the moving object 81.

As described above, even in a case where the subject detection processing based on the pixel data obtained by the imaging element 5 while the obstruction flag is invalid (for example, at time point t3) results in a failure, the digital camera 100 may maintain the detection state of the subject detected by the subject detection processing based on the pixel data obtained by the imaging element 5 before the failure. Accordingly, it is possible to suppress erroneous operation such as stopping the tracking processing of the moving object 81 or erroneous operation such as switching a subject to be detected to an object different from the moving object 81 in a case where the moving object 81 is temporarily obstructed.

Figure 16:
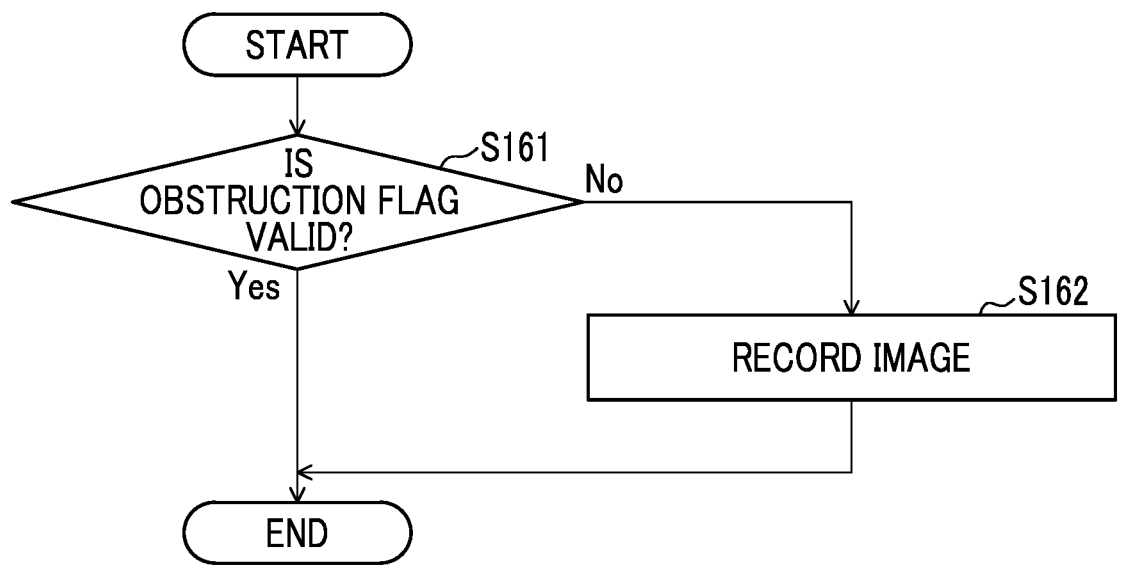
FIG. 16 is a flowchart illustrating Specific Example 5 of the imaging control via the digital camera 100 based on the detection result of obstruction of the moving object 81.

FIG. 16 is a flowchart illustrating Specific Example 5 of the imaging control via the digital camera 100 based on the detection result of obstruction of the moving object 81. For example, the digital camera 100 may repeatedly execute the processing illustrated in FIG. 16 together with the processing illustrated in FIG. 7. For example, the processing in FIG. 16 is executed by the system control unit 11. In addition, for example, the processing in FIG. 16 is executed each time the pixel data is obtained by the imaging element 5 when continuous imaging is performed by the imaging element 5.

When the continuous imaging is performed by the imaging element 5, this corresponds to a case where a live preview image (live view image) is displayed in an imaging mode for still images, when a video image is captured, when still images are continuously captured (continuous shooting), or the like.

First, the digital camera 100 determines whether or not the obstruction flag is valid (step S161). In a case where the obstruction flag is not valid (step S161: No), the digital camera 100 records an image of the obtained pixel data (step S162) and ends the series of processes. Recording of the image based on the pixel data is recording of the pixel data on the recording medium 21 or recording of an image generated based on the pixel data on the recording medium 21.

In step S161, in a case where the obstruction flag is valid (step S161: Yes), the digital camera 100 does not record the image of the obtained pixel data and ends the series of processes.

For example, in the examples illustrated in FIG. 8 to FIG. 11, the digital camera 100 records images of the pixel data PD1 and PD2 obtained at time points t1 and t2 and does not record an image of the pixel data PD3 obtained at time point t3.

As described above, in a case where obstruction of the moving object 81 at time point t3 is detected, the digital camera 100 may stop recording of the image based on the pixel data obtained by the imaging element 5 at time point t3. Accordingly, it is possible not to record the image based on the pixel data obtained at time point t3 at which the moving object 81 is obstructed, that is, pixel data having a strong possibility of not capturing the moving object 81 in a preferable state. Thus, an effort of deleting a non-preferable image for the user can be eliminated. In addition, it is possible to save a recording capacity of the recording medium 21.

Figure 17:
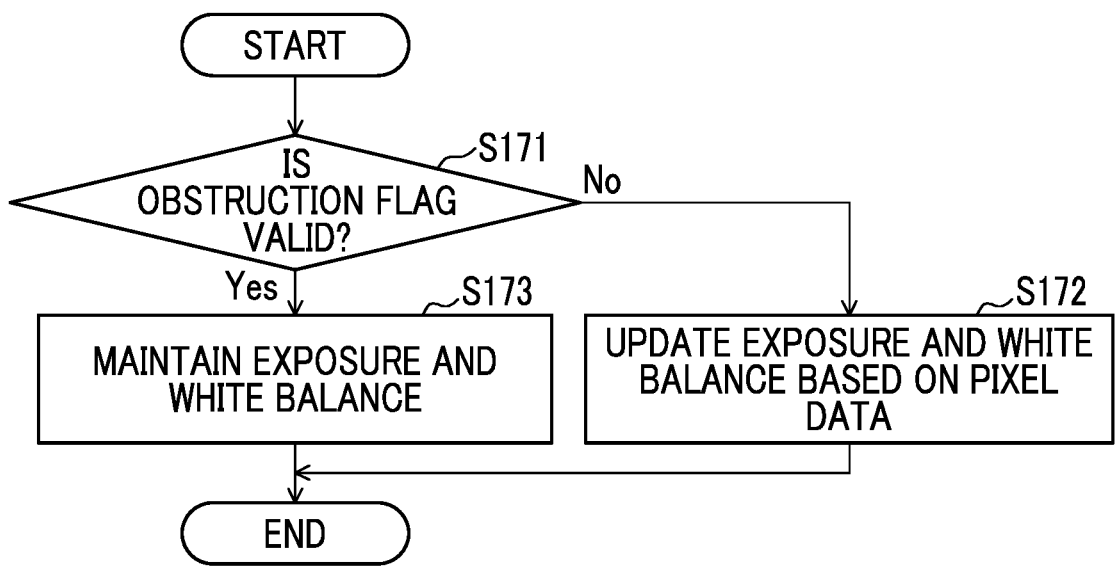
FIG. 17 is a flowchart illustrating Specific Example 6 of the imaging control via the digital camera 100 based on the detection result of obstruction of the moving object 81.

FIG. 17 is a flowchart illustrating Specific Example 6 of the imaging control via the digital camera 100 based on the detection result of obstruction of the moving object 81. For example, the digital camera 100 may repeatedly execute the processing illustrated in FIG. 17 together with the processing illustrated in FIG. 7. For example, the processing in FIG. 17 is executed by the system control unit 11. In addition, for example, the processing in FIG. 17 is executed each time the pixel data is obtained by the imaging element 5 when continuous imaging is performed by the imaging element 5.

First, the digital camera 100 determines whether or not the obstruction flag is valid (step S171). In a case where the obstruction flag is not valid (step S171: No), the digital camera 100 updates exposure and white balance based on the currently obtained pixel data (step S172) and ends the series of processes.

In step S172, for example, the digital camera 100 calculates appropriate exposure and appropriate white balance to be applied to the pixel data based on data of a part corresponding to the subject in the currently obtained pixel data. The digital camera 100 performs processing of applying the calculated exposure and the calculated white balance to recording of the pixel data on the recording medium 21, displaying of the live preview image based on the pixel data, and the like.

In step S171, in a case where the obstruction flag is valid (step S171: Yes), the digital camera 100 maintains exposure and white balance of the pixel data (step S173) and ends the series of processes.

For example, in the examples illustrated in FIG. 8 to FIG. 11, the digital camera 100 maintains the exposure and the white balance calculated based on the data of the part corresponding to the subject in the pixel data obtained at time point t2 as exposure and white balance to be applied to recording of the pixel data obtained at time point t3 on the recording medium 21, displaying of the live preview image based on the pixel data obtained at time point t3, and the like. While a case of performing the processing in FIG. 17 with respect to the exposure and to the white balance has been described, the processing in FIG. 17 may be performed with respect to only one of the exposure and the white balance.

As described above, in a case where obstruction of the moving object 81 at time point t3 is detected, the digital camera 100 may stop control of at least any of the exposure or the white balance based on the pixel data obtained by the imaging element 5 at time point t3. Accordingly, it is possible not to change the exposure and the white balance based on the pixel data obtained at time point t3 at which the moving object 81 is obstructed, that is, pixel data having a strong possibility of not sufficiently capturing a subject as a reference for automatically setting the exposure and the white balance.

Figure 18:
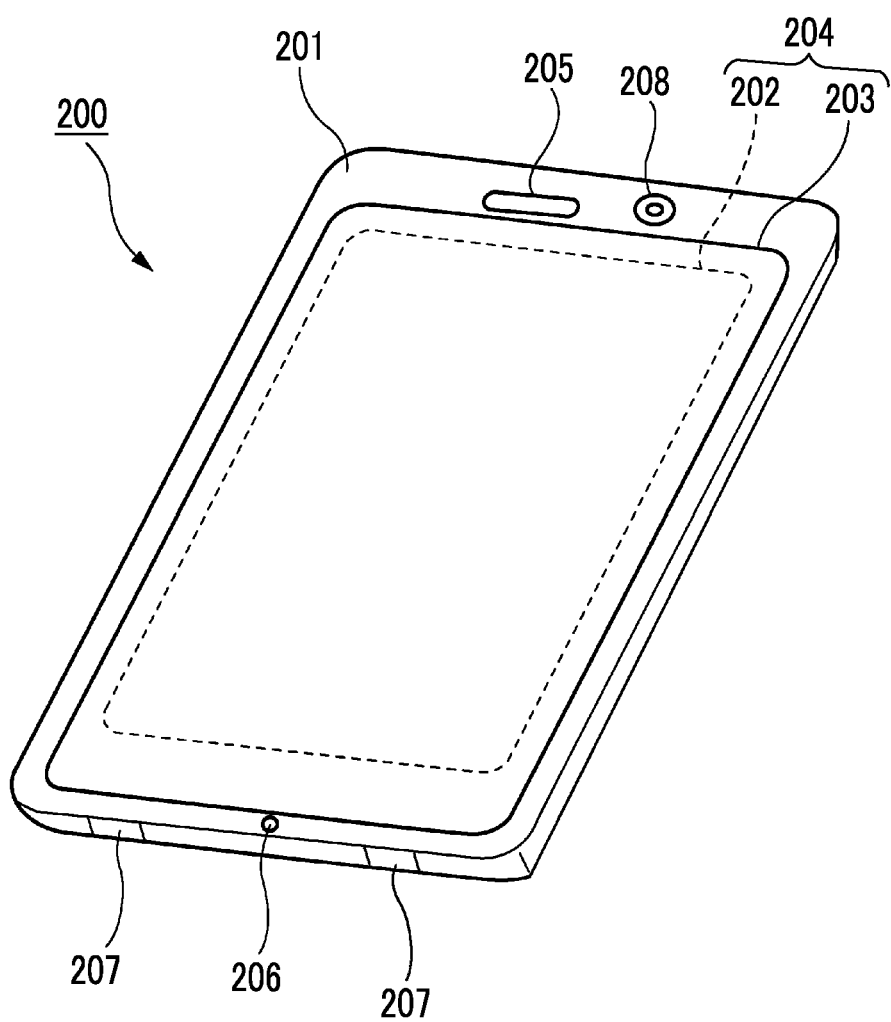
FIG. 18 illustrates an exterior of a smartphone 200 that is another embodiment of the imaging apparatus according to the present invention.

FIG. 18 illustrates an exterior of a smartphone 200 that is another embodiment of the imaging apparatus according to the present invention.

The smartphone 200 illustrated in FIG. 18 includes a casing 201 having a flat plate shape and comprises a display and input unit 204 in which a display panel 202 as a display unit and an operation panel 203 as an input unit are integrated on one surface of the casing 201.

In addition, the casing 201 comprises a speaker 205, a microphone 206, an operation unit 207, and a camera unit 208. The configuration of the casing 201 is not limited thereto and can employ, for example, a configuration in which the display unit and the input unit are independently disposed, or a configuration that has a folded structure or a sliding mechanism.

Figure 19:
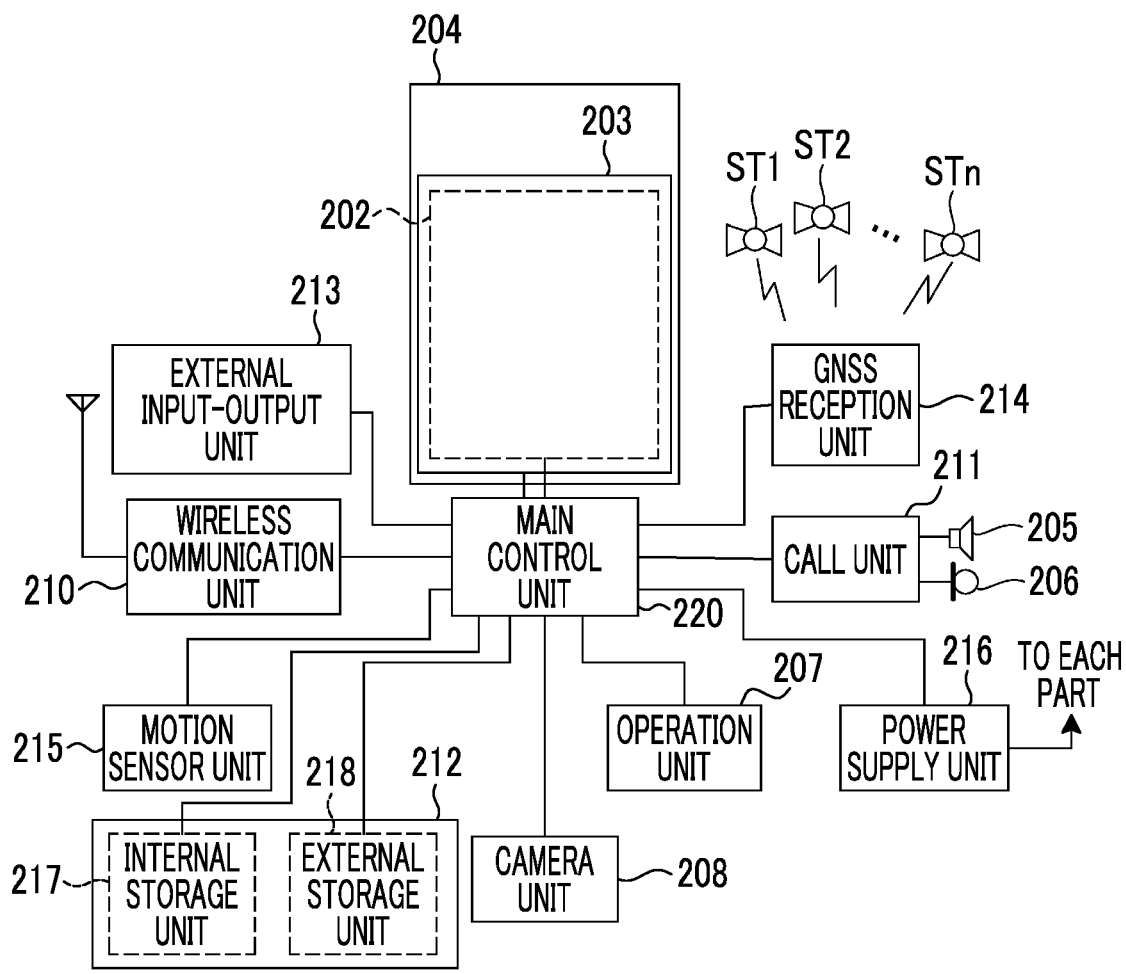
FIG. 19 is a block diagram illustrating a configuration of the smartphone 200 illustrated in FIG. 18.

FIG. 19 is a block diagram illustrating a configuration of the smartphone 200 illustrated in FIG. 18.

As illustrated in FIG. 19, a wireless communication unit 210, the display and input unit 204, a call unit 211, the operation unit 207, the camera unit 208, a storage unit 212, an external input-output unit 213, a global navigation satellite system (GNSS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with instructions from the main control unit 220. By using the wireless communication, transmission and reception of various file data such as audio data and image data, electronic mail data, or the like and reception of web data, streaming data, or the like are performed.

The display and input unit 204 is a so-called touch panel that visually delivers information to the user by displaying images (still images and video images), text information, or the like and that detects a user operation with respect to the displayed information under control of the main control unit 220. The display and input unit 204 comprises the display panel 202 and the operation panel 203.

The display panel 202 uses a liquid crystal display (LCD), an organic electro-luminescence display (OELD), or the like as a display device.

The operation panel 203 is a device that is placed such that an image displayed on a display surface of the display panel 202 can be visually recognized, and that detects one or a plurality of coordinates operated with a finger of the user or with a stylus. In a case where the device is operated with the finger of the user or with the stylus, a detection signal generated by the operation is output to the main control unit

220. Next, the main control unit 220 detects an operation position (coordinate) on the display panel 202 based on the received detection signal.

As illustrated in FIG. 19, while the display panel 202 and the operation panel 203 of the smartphone 200 illustrated as an embodiment of the imaging apparatus according to the present invention are integrated to constitute the display and input unit 204, the operation panel 203 is disposed to completely cover the display panel 202.

In a case where such disposition is employed, the operation panel 203 may have a function of detecting the user operation even in a region outside the display panel 202. In other words, the operation panel 203 may comprise a detection region (hereinafter, referred to as a display region) for an overlapping part overlapping with the display panel 202 and a detection region (hereinafter, referred to as a non-display region) for an outer edge part, other than the overlapping part, that does not overlap with the display panel 202.

A size of the display region and a size of the display panel 202 may completely match, but both sizes do not need to match. In addition, the operation panel 203 may comprise two sensitive regions of the outer edge part and an inner part other than the outer edge part. Furthermore, a width of the outer edge part is appropriately designed depending on a size and the like of the casing 201.

Furthermore, examples of a position detection system employed in the operation panel 203 include a matrix switch system, a resistive membrane system, a surface acoustic wave method, an infrared method, an electromagnetic induction method, and a capacitance method, and any system can be employed.

The call unit 211 comprises the speaker 205 or the microphone 206, and converts voice of the user input through the microphone 206 into audio data processable in the main control unit 220 and outputs the audio data to the main control unit 220, or decodes audio data received by the wireless communication unit 210 or by the external input-output unit 213 and outputs the decoded audio data from the speaker 205.

In addition, as illustrated in FIG. 18, for example, the speaker 205 can be mounted on the same surface as a surface on which the display and input unit 204 is provided, and the microphone 206 can be mounted on a side surface of the casing 201.

The operation unit 207 is a hardware key that uses a key switch or the like, and receives instructions from the user. For example, as illustrated in FIG. 18, the operation unit 207 is a push button-type switch that is mounted on a side surface of the casing 201 of the smartphone 200 and that is set to an ON state in a case where the switch is pressed with the finger or the like, and is set to an OFF state by restoring force of a spring or the like in a case where the finger is released.

In the storage unit 212, a control program and control data of the main control unit 220, application software, address data in which a name, a telephone number, or the like of a communication counterpart is associated, transmitted and received electronic mail data, web data downloaded by web browsing, and downloaded contents data are stored, and streaming data or the like is temporarily stored. In addition, the storage unit 212 is configured with an internal storage unit 217 incorporated in the smartphone and with an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 functions as an interface with all external apparatuses connected to the smartphone 200 and is directly or indirectly connected to other external apparatuses by communication or the like (for example, a universal serial bus (USB), IEEE1394, Bluetooth (registered trademark), radio frequency identification (RFID), infrared communication (Infrared Data Association (IrDA) (registered trademark)), Ultra Wideband (UWB) (registered trademark), or ZigBee (registered trademark)) or through a network (for example, Ethernet (registered trademark) or a wireless local area network (LAN)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone connected in a wired/wireless manner.

The external input-output unit 213 can deliver data transferred from the external apparatuses to each constituent in the smartphone 200 or transfer data in the smartphone 200 to the external apparatuses.

The GNSS reception unit 214 receives GNSS signals transmitted from GNSS satellites ST1 to STn, executes positioning computation processing based on the received plurality of GNSS signals, and detects a position consisting of a latitude, a longitude, and an altitude of the smartphone 200 in accordance with instructions from the main control unit 220. In a case where positional information can be acquired from the wireless communication unit 210 or from the external input-output unit 213 (for example, a wireless LAN), the GNSS reception unit 214 can detect the position using the positional information.

The motion sensor unit 215 comprises, for example, a three-axis acceleration sensor and detects a physical motion of the smartphone 200 in accordance with instructions from the main control unit 220. By detecting the physical motion of the smartphone 200, a movement direction or acceleration of the smartphone 200 is detected. A detection result is output to the main control unit 220.

The power supply unit 216 supplies power stored in a battery (not illustrated) to each part of the smartphone 200 in accordance with instructions from the main control unit 220.

The main control unit 220 comprises a microprocessor, operates in accordance with the control program and with the control data stored in the storage unit 212, and manages and controls each part of the smartphone 200. In addition, the main control unit 220 has a mobile communication control function of controlling each part of a communication system and an application processing function in order to perform voice communication or data communication through the wireless communication unit 210.

The application processing function is implemented by operating the main control unit 220 in accordance with the application software stored in the storage unit 212. For example, the application processing function is an infrared communication function of performing data communication with counter equipment by controlling the external input-output unit 213, an electronic mail function of transmitting and receiving electronic mails, or a web browsing function of viewing a web page.

In addition, the main control unit 220 has an image processing function such as displaying an image on the display and input unit 204 based on image data (data of a still image or of a video image) such as reception data or downloaded streaming data.

The image processing function refers to a function of causing the main control unit 220 to decode the image data, perform image processing on the decoding result, and display the image on the display and input unit 204.

Furthermore, the main control unit 220 executes a display control of the display panel 202 and an operation detection control of detecting user operations performed through the operation unit 207 and through the operation panel 203.

By executing the display control, the main control unit 220 displays an icon for starting the application software or for a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation performed through the operation unit 207, receives an operation with respect to the icon and an input of a text string in an input field of the window through the operation panel 203, or receives a request for scrolling the display image made through the scroll bar.

Furthermore, by executing the operation detection control, the main control unit 220 is provided with a touch panel control function of determining whether the operation position on the operation panel 203 is in the overlapping part (display region) overlapping with the display panel 202 or is in the other outer edge part (non-display region) not overlapping with the display panel 202 and of controlling the sensitive region of the operation panel 203 or a display position of the software key.

In addition, the main control unit 220 can detect a gesture operation with respect to the operation panel 203 and execute a function set in advance in accordance with the detected gesture operation.

The gesture operation is not a simple touch operation in the related art and means an operation of drawing a path with the finger or the like, designating a plurality of positions at the same time, or as a combination thereof, drawing a path from at least one of the plurality of positions.

The camera unit 208 includes configurations other than the external memory control unit 20, the recording medium 21, the display control unit 22, the display unit 23, and the operation unit 14 in the digital camera 100 illustrated in FIG. 1. Captured image data generated by the camera unit 208 can be recorded in the storage unit 212 or be output through the external input-output unit 213 or through the wireless communication unit 210.

In the smartphone 200 illustrated in FIG. 18, the camera unit 208 is mounted on the same surface as the display and input unit 204. However, a mount position of the camera unit 208 is not limited thereto. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as an operation input of the operation panel 203.

In addition, in detecting the position via the GNSS reception unit 214, the position can be detected by referring to the image from the camera unit 208. Furthermore, by referring to the image from the camera unit 208, it is possible to determine an optical axis direction of the camera unit 208 of the smartphone 200 or to determine the current use environment without using the three-axis acceleration sensor or by using the three-axis acceleration sensor together. The image from the camera unit 208 can also be used in the application software.

In addition, image data of a still image or of a video image to which the positional information acquired by the GNSS reception unit 214, voice information (may be text information acquired by performing voice to text conversion via the main control unit or the like) acquired by the microphone 206, posture information acquired by the motion sensor unit 215, or the like is added can be stored in the storage unit 212 or be output through the external input-output unit 213 or through the wireless communication unit 210.

Even in the smartphone 200 having the above configuration, it is possible to suppress erroneous operation caused by obstruction of the subject which is a moving object, by performing the above processing via the system control unit 11 illustrated in FIG. 1.

Modification Example 1

While a case of detecting the phase difference in the row direction X has been illustrated in the embodiment, the present invention can also be applied to a case of detecting the phase difference in the column direction Y.

Modification Example 2

While a case of performing AF detection based on the phase difference AF system via the phase difference AF processing unit 19 as AF detection has been described in the embodiment, it may also be configured to perform the AF detection based on the contrast system via the contrast AF processing unit 18 as the AF detection. In addition, it may be configured to perform the AF detection based on a combination of the phase difference AF system and the contrast system as the AF detection.

As described above, the following matters are disclosed in the present specification.

(1) An imaging apparatus comprising an imaging element that images a subject through an imaging optical system, and a processor, in which the processor is configured to detect a moving object present in a plurality of pieces of pixel data obtained by the imaging element at different time points, perform detection processing of obstruction of the moving object by an object at a time point in the future based on a result of comparison between a first distance that is a predicted distance to the moving object at the time point in the future and a second distance that is a distance to the object present at a predicted positional coordinate of the moving object at the time point in the future, and perform an imaging control based on a result of the detection processing.

(2) The imaging apparatus according to (1), in which the processor is configured to calculate the predicted positional coordinate of the moving object at the time point in the future based on each positional coordinate of the moving object in the plurality of pieces of pixel data.

(3) The imaging apparatus according to (1) or (2), in which the processor is configured to calculate the first distance based on detection results of a distance to the moving object at a plurality of time points before the time point in the future.

(4) The imaging apparatus according to any one of (1) to (3), in which the processor is configured to calculate a distance to the object at a time point before the time point in the future as the second distance.

(5) The imaging apparatus according to any one of (1) to (4), in which the processor is configured to detect the obstruction in a case where the first distance is longer than the second distance in the detection processing.

(6) The imaging apparatus according to any one of (1) to (5), in which the processor is configured to, in a case where the obstruction is detected by the detection processing, stop driving of a focus mechanism of the imaging optical system based on a detection result of a distance to the moving object at the time point in the future.

(7) The imaging apparatus according to (6), in which the processor is configured to, in a case where the obstruction is detected by the detection processing, calculate a predicted time point at which the obstruction is eliminated after the time point in the future, and resume driving of the focus mechanism of the imaging optical system based on the detection result of the distance to the moving object at the predicted time point.

(8) The imaging apparatus according to any one of (1) to (7), in which the processor is configured to, in a case where the obstruction is detected by the detection processing, drive a focus mechanism of the imaging optical system at the time point in the future based on detection results of a distance to the moving object at a plurality of time points before the time point in the future.

(9) The imaging apparatus according to any one of (1) to (8), in which the processor is configured to, in a case where the obstruction is detected by the detection processing, stop subject detection processing based on pixel data obtained by the imaging element at the time point in the future.

(10) The imaging apparatus according to any one of (1) to (9), in which the processor is configured to, in a case where the obstruction is detected by the detection processing, maintain a detection state of the subject detected by subject detection processing based on pixel data obtained by the imaging element before the time point in the future, even in a case where the subject detection processing based on pixel data obtained by the imaging element at the time point in the future results in a failure.

(11) The imaging apparatus according to any one of (1) to (10), in which the processor is configured to, in a case where the obstruction is detected, calculate a predicted time point at which the obstruction is eliminated after the time point in the future, calculate a predicted positional coordinate of the moving object at the predicted time point, and perform subject detection processing based on data corresponding to the predicted positional coordinate of the moving object at the predicted time point among pixel data obtained by the imaging element at the predicted time point.

(12) The imaging apparatus according to any one of (1) to (11), in which the processor is configured to, in a case where the obstruction is detected by the detection processing, stop recording of an image based on pixel data obtained by the imaging element at the time point in the future.

(13) The imaging apparatus according to any one of (1) to (12), in which the processor is configured to, in a case where the obstruction is detected by the detection processing, stop control of at least any of exposure or white balance based on pixel data obtained by the imaging element at the time point in the future.

(14) An imaging method of an imaging apparatus including an imaging element that images a subject through an imaging optical system, and a processor, the imaging method comprising, via the processor, detecting a moving object present in a plurality of pieces of pixel data obtained by the imaging element at different time points, performing detection processing of obstruction of the moving object by an object at a time point in the future based on a result of comparison between a first distance that is a predicted distance to the moving object at the time point in the future and a second distance that is a distance to the object present at a predicted positional coordinate of the moving object at the time point in the future, and performing an imaging control based on a result of the detection processing.

(15) The imaging method according to (14), in which the processor is configured to calculate the predicted positional coordinate of the moving object at the time point in the future based on each positional coordinate of the moving object in the plurality of pieces of pixel data.

(16) The imaging method according to (14) or (15), in which the processor is configured to calculate the first distance based on detection results of a distance to the moving object at a plurality of time points before the time point in the future.

(17) The imaging method according to any one of (14) to (16), in which the processor is configured to calculate a distance to the object at a time point before the time point in the future as the second distance.

(18) The imaging method according to any one of (14) to (17), in which the processor is configured to detect the obstruction in a case where the first distance is longer than the second distance in the detection processing.

(19) The imaging method according to any one of (14) to (18), in which the processor is configured to, in a case where the obstruction is detected by the detection processing, stop driving of a focus mechanism of the imaging optical system based on a detection result of a distance to the moving object at the time point in the future.

(20) The imaging method according to (19), in which the processor is configured to, in a case where the obstruction is detected by the detection processing, calculate a predicted time point at which the obstruction is eliminated after the time point in the future, and resume driving of the focus mechanism of the imaging optical system based on the detection result of the distance to the moving object at the predicted time point.

(21) The imaging method according to any one of (14) to (20), in which the processor is configured to, in a case where the obstruction is detected by the detection processing, drive a focus mechanism of the imaging optical system at the time point in the future based on detection results of a distance to the moving object at a plurality of time points before the time point in the future.

(22) The imaging method according to any one of (14) to (21), in which the processor is configured to, in a case where the obstruction is detected by the detection processing, stop subject detection processing based on pixel data obtained by the imaging element at the time point in the future.
(23) The imaging method according to any one of (14) to (22), in which the processor is configured to, in a case where the obstruction is detected by the detection processing, maintain a detection state of the subject detected by subject detection processing based on pixel data obtained by the imaging element before the time point in the future, even in a case where the subject detection processing based on pixel data obtained by the imaging element at the time point in the future results in a failure.
(24) The imaging method according to any one of (14) to (23), in which the processor is configured to, in a case where the obstruction is detected, calculate a predicted time point at which the obstruction is eliminated after the time point in the future, calculate a predicted positional coordinate of the moving object at the predicted time point, and perform subject detection processing based on data corresponding to the predicted positional coordinate of the moving object at the predicted time point among pixel data obtained by the imaging element at the predicted time point.
(25) The imaging method according to any one of (14) to (24), in which the processor is configured to, in a case where the obstruction is detected by the detection processing, stop recording of an image based on pixel data obtained by the imaging element at the time point in the future.
(26) The imaging method according to any one of (14) to (25), in which the processor is configured to, in a case where the obstruction is detected by the detection processing, stop control of at least any of exposure or white balance based on pixel data obtained by the imaging element at the time point in the future.
(27) An imaging program of an imaging apparatus including an imaging element that images a subject through an imaging optical system, and a processor, the imaging program causing the processor to execute a process comprising detecting a moving object present in a plurality of pieces of pixel data obtained by the imaging element at different time points, performing detection processing of obstruction of the moving object by an object at a time point in the future based on a result of comparison between a first distance that is a predicted distance to the moving object at the time point in the future and a second distance that is a distance to the object present at a predicted positional coordinate of the moving object at the time point in the future, and performing an imaging control based on a result of the detection processing.

While various embodiments have been described above with reference to the drawings, the present invention is, of course, not limited to such examples. It is apparent that those skilled in the art may perceive various modification examples or correction examples within the scope disclosed in the claims, and those examples are also understood as falling within the technical scope of the present invention. In addition, each constituent in the embodiment may be arbitrarily combined without departing from the gist of the invention.

The present application is based on Japanese Patent Application (JP2021-005139) filed on Jan. 15, 2021, the content of which is incorporated in the present application by reference.

The present invention is particularly applied to a digital camera or the like to provide high convenience and effectiveness.

EXPLANATION OF REFERENCES

1: imaging lens
4: lens control unit
5: imaging element
6: analog signal processing unit
7: analog-to-digital conversion circuit
8: lens drive unit
9: stop drive unit
10: imaging element drive unit
11: system control unit
14, 207: operation unit
15: memory control unit
16: main memory
17: digital signal processing section
18: contrast AF processing unit
19: phase difference AF processing unit
20: external memory control unit
21: recording medium
22: display control unit
23: display unit
25: data bus
40: lens device
50: light-receiving surface
51: pixel
53: AF area
81: moving object
82: object
100: digital camera
200: smartphone
201: casing
202: display panel
203: operation panel
204: display and input unit
205: speaker
206: microphone
208: camera unit
210: wireless communication unit
211: call unit
212: storage unit
213: external input-output unit
214: GNSS reception unit
215: motion sensor unit
216: power supply unit
217: internal storage unit
218: external storage unit
220: main control unit
r1, r2, g1, g2, b1, b2, 52A, 52B: phase difference detection pixel
PD1 to PD4: pixel data
ST1 to STn: GNSS satellite

What is claimed is:
1. An imaging apparatus comprising:
an imaging element that images a subject through an imaging optical system; and
a processor,
wherein the processor is configured to:
detect a moving object present in a plurality of pieces of pixel data obtained by the imaging element at different time points;
perform detection processing of obstruction of the moving object by an object at a time point in a future based on a result of comparison between a first distance that is a predicted distance to the moving object at the time point in the future and a second distance that is a distance to the object present at a predicted positional coordinate of the moving object at the time point in the future; and perform an imaging control based on a result of the detection processing.

2. The imaging apparatus according to claim 1, wherein the processor is configured to calculate the predicted positional coordinate of the moving object at the time point in the future based on each positional coordinate of the moving object in the plurality of pieces of pixel data.

3. The imaging apparatus according to claim 1, wherein the processor is configured to calculate the first distance based on detection results of a distance to the moving object at a plurality of time points before the time point in the future.

4. The imaging apparatus according to claim 1, wherein the processor is configured to calculate a distance to the object at a time point before the time point in the future as the second distance.

5. The imaging apparatus according to claim 1, wherein the processor is configured to detect the obstruction in a case where the first distance is longer than the second distance in the detection processing.

6. The imaging apparatus according to claim 1, wherein the processor is configured to, in a case where the obstruction is detected by the detection processing, stop driving of a focus mechanism of the imaging optical system based on a detection result of a distance to the moving object at the time point in the future.

7. The imaging apparatus according to claim 6, wherein the processor is configured to, in a case where the obstruction is detected by the detection processing, calculate a predicted time point at which the obstruction is eliminated after the time point in the future, and resume driving of the focus mechanism of the imaging optical system based on the detection result of the distance to the moving object at the predicted time point.

8. The imaging apparatus according to claim 1, wherein the processor is configured to, in a case where the obstruction is detected by the detection processing, drive a focus mechanism of the imaging optical system at the time point in the future based on detection results of a distance to the moving object at a plurality of time points before the time point in the future.

9. The imaging apparatus according to claim 1, wherein the processor is configured to, in a case where the obstruction is detected by the detection processing, stop subject detection processing based on pixel data obtained by the imaging element at the time point in the future.

10. The imaging apparatus according to claim 1, wherein the processor is configured to, in a case where the obstruction is detected by the detection processing, maintain a detection state of the subject detected by subject detection processing based on pixel data obtained by the imaging element before the time point in the future, even in a case where the subject detection processing based on pixel data obtained by the imaging element at the time point in the future results in a failure.

11. The imaging apparatus according to claim 1, wherein the processor is configured to:
in a case where the obstruction is detected, calculate a predicted time point at which the obstruction is eliminated after the time point in the future;
calculate a predicted positional coordinate of the moving object at the predicted time point; and
perform subject detection processing based on data corresponding to the predicted positional coordinate of the moving object at the predicted time point among pixel data obtained by the imaging element at the predicted time point.

12. The imaging apparatus according to claim 1, wherein the processor is configured to, in a case where the obstruction is detected by the detection processing, stop recording of an image based on pixel data obtained by the imaging element at the time point in the future.

13. The imaging apparatus according to claim 1, wherein the processor is configured to, in a case where the obstruction is detected by the detection processing, stop control of at least one of exposure or white balance based on pixel data obtained by the imaging element at the time point in the future.

14. An imaging method of an imaging apparatus including an imaging element that images a subject through an imaging optical system, and a processor, the imaging method comprising:
via the processor,
detecting a moving object present in a plurality of pieces of pixel data obtained by the imaging element at different time points;
performing detection processing of obstruction of the moving object by an object at a time point in the future based on a result of comparison between a first distance that is a predicted distance to the moving object at the time point in the future and a second distance that is a distance to the object present at a predicted positional coordinate of the moving object at the time point in the future; and
performing an imaging control based on a result of the detection processing.

15. The imaging method according to claim 14, comprising, via the processor,
calculating the predicted positional coordinate of the moving object at the time point in the future based on each positional coordinate of the moving object in the plurality of pieces of pixel data.

16. The imaging method according to claim 14, comprising, via the processor,
calculating the first distance based on detection results of a distance to the moving object at a plurality of time points before the time point in the future.

17. The imaging method according to claim 14, comprising, via the processor,
calculating a distance to the object at a time point before the time point in the future as the second distance.

18. The imaging method according to claim 14, comprising, via the processor,
detecting the obstruction in a case where the first distance is longer than the second distance in the detection processing.

19. The imaging method according to claim 14, comprising, via the processor,
in a case where the obstruction is detected by the detection processing, stopping driving of a focus mechanism of the imaging optical system based on a detection result of a distance to the moving object at the time point in the future.

20. The imaging method according to claim 19, comprising, via the processor,
in a case where the obstruction is detected by the detection processing, calculating a predicted time point at which the obstruction is eliminated after the time point in the future, and resuming driving of the focus mechanism of the imaging optical system based on the detection result of the distance to the moving object at the predicted time point.

21. The imaging method according to claim 14, comprising, via the processor,
in a case where the obstruction is detected by the detection processing, driving a focus mechanism of the imaging optical system at the time point in the future based on detection results of a distance to the moving object at a plurality of time points before the time point in the future.

22. The imaging method according to claim 14, comprising, via the processor,
in a case where the obstruction is detected by the detection processing, stopping subject detection processing based on pixel data obtained by the imaging element at the time point in the future.

23. The imaging method according to claim 14, comprising, via the processor,
in a case where the obstruction is detected by the detection processing, maintaining a detection state of the subject detected by subject detection processing based on pixel data obtained by the imaging element before the time point in the future, even in a case where the subject detection processing based on pixel data obtained by the imaging element at the time point in the future results in a failure.

24. The imaging method according to claim 14, comprising, via the processor,
in a case where the obstruction is detected, calculating a predicted time point at which the obstruction is eliminated after the time point in the future;
calculating a predicted positional coordinate of the moving object at the predicted time point; and
performing subject detection processing based on data corresponding to the predicted positional coordinate of the moving object at the predicted time point among pixel data obtained by the imaging element at the predicted time point.

25. The imaging method according to claim 14, comprising, via the processor,
in a case where the obstruction is detected by the detection processing, stopping recording of an image based on pixel data obtained by the imaging element at the time point in the future.

26. The imaging method according to claim 14, comprising, via the processor,
in a case where the obstruction is detected by the detection processing, stopping control of at least any of exposure or white balance based on pixel data obtained by the imaging element at the time point in the future.

27. A non-transitory computer readable medium storing an imaging program of an imaging apparatus including an imaging element that images a subject through an imaging optical system, and a processor, the imaging program causing the processor to execute a process comprising:
detecting a moving object present in a plurality of pieces of pixel data obtained by the imaging element at different time points;
performing detection processing of obstruction of the moving object by an object at a time point in the future based on a result of comparison between a first distance that is a predicted distance to the moving object at the time point in the future and a second distance that is a distance to the object present at a predicted positional coordinate of the moving object at the time point in the future; and
performing an imaging control based on a result of the detection processing.

* * * * *